(12) United States Patent
Nouhra et al.

(10) Patent No.: US 12,239,899 B2
(45) Date of Patent: Mar. 4, 2025

(54) SNOWBOARDS, SKIS AND METHOD OF MANUFACTURING SAME

(71) Applicant: SWS Sports Boards Industries LLC, Dubai (AE)

(72) Inventors: Rainier Nouhra, Dubai (AE); George Cant, Dubai (AE); John Colvin, Dubai (AE)

(73) Assignee: SWS Sports Boards Industries LLC, Dubai (AE)

( * ) Notice: Subject to any disclaimer, the term of this patent is extended or adjusted under 35 U.S.C. 154(b) by 53 days.

(21) Appl. No.: 17/301,437

(22) Filed: Apr. 2, 2021

(65) Prior Publication Data

US 2022/0314101 A1   Oct. 6, 2022

(51) Int. Cl.
*A63C 5/12*   (2006.01)
*B29C 70/00*   (2006.01)
(Continued)

(52) U.S. Cl.
CPC .............. *A63C 5/126* (2013.01); *B29C 70/00* (2013.01); *B32B 3/04* (2013.01); *B32B 5/022* (2013.01);
(Continued)

(58) Field of Classification Search
CPC ........... A63C 5/126; B29C 70/00; B32B 3/04; B32B 5/022; B32B 27/06; B32B 37/02; B32B 37/1045; B32B 37/187; B32B 37/26; B32B 38/1841; B32B 5/245; B32B 21/10; B32B 27/065; B32B 38/105;
(Continued)

(56) References Cited

U.S. PATENT DOCUMENTS 4,939,873 A * 7/1990 Smialek .................. B24B 3/006
                                                          451/28
5,156,413 A    10/1992 Juhasz
(Continued)

FOREIGN PATENT DOCUMENTS

DE           2424880 A1    12/1975
DE     102007031873 A1     1/2009
(Continued)

*Primary Examiner* — Christopher W Raimund
(74) *Attorney, Agent, or Firm* — FisherBroyles LLP

(57) ABSTRACT

Snowboards are constructed by initial manufacture of a base sub-assembly including fewer than all layers of the snowboard, e.g., a base layer, edges, and a stabilizing layer. These layers are permanently bonded together into a unitary base sub-assembly. The running (bottom) surface is then finished to provide a desired surface consistency by eliminating undesired irregularities from the manufacturing process, e.g., using a conventional base grinding machine. Subsequently, the base sub-assembly and remaining snowboard layers (e.g., top sheet and a core sandwiched between reinforcing layers) are permanently bonded together into a unitary final snowboard assembly, which may then be worked to form a finished snowboard. Snowboards may be either flat or non-flat in both the longitudinal and transverse directions. Accordingly, the method may be used to produce snowboards having a desired sanded/ground base surface having a desired surface consistency, even for snowboards that are non-flat in the transverse direction.

43 Claims, 12 Drawing Sheets

(51) Int. Cl.
  *B32B 3/04* (2006.01)
  *B32B 5/02* (2006.01)
  *B32B 5/24* (2006.01)
  *B32B 21/10* (2006.01)
  *B32B 27/06* (2006.01)
  *B32B 37/00* (2006.01)
  *B32B 37/02* (2006.01)
  *B32B 37/10* (2006.01)
  *B32B 37/12* (2006.01)
  *B32B 37/26* (2006.01)
  *B32B 38/00* (2006.01)
  *B32B 38/18* (2006.01)

(52) U.S. Cl.
  CPC .............. *B32B 27/06* (2013.01); *B32B 37/02* (2013.01); *B32B 37/1045* (2013.01); *B32B 37/187* (2013.01); *B32B 37/26* (2013.01); *B32B 38/1841* (2013.01); *B32B 5/245* (2013.01); *B32B 21/10* (2013.01); *B32B 27/065* (2013.01); *B32B 2037/1253* (2013.01); *B32B 2038/0016* (2013.01); *B32B 38/105* (2013.01); *B32B 2260/023* (2013.01); *B32B 2260/046* (2013.01); *B32B 2305/72* (2013.01); *B32B 2309/02* (2013.01); *B32B 2309/12* (2013.01); *B32B 2315/085* (2013.01)

(58) Field of Classification Search
  CPC .... B32B 2037/1253; B32B 2038/0016; B32B 2260/023; B32B 2260/046; B32B 2305/72; B32B 2309/02; B32B 2309/12; B32B 2315/085
  See application file for complete search history.

(56) References Cited

U.S. PATENT DOCUMENTS

| | | | |
|---|---|---|---|
| 5,189,130 A * | 2/1993 | Kageyama | A63C 5/044 |
| | | | 526/352 |
| 5,203,118 A * | 4/1993 | Bocquet | A63C 11/04 |
| | | | 451/301 |
| 5,301,965 A * | 4/1994 | Floreani | A63C 5/0405 |
| | | | 280/600 |
| 5,346,244 A * | 9/1994 | Le Masson | A63C 5/04 |
| | | | 280/607 |
| 5,447,322 A * | 9/1995 | le Masson | A63C 5/07 |
| | | | 280/610 |
| 6,349,961 B1 | 2/2002 | Colley | |
| 7,234,721 B2 | 6/2007 | Derocco | |
| 7,510,206 B2 | 3/2009 | Walker | |
| 8,104,784 B2 | 1/2012 | Sylvain | |
| 8,220,821 B2 | 7/2012 | O'Byrne | |
| 8,535,811 B2 | 9/2013 | Luetzeler | |
| 8,984,729 B2 | 3/2015 | Kilchenstein | |
| 9,199,156 B2 | 12/2015 | Bjertnaes | |
| 2007/0018431 A1 * | 1/2007 | Turner | A63C 5/126 |
| | | | 280/610 |
| 2011/0180201 A1 | 7/2011 | Huber | |
| 2012/0031546 A1 | 2/2012 | Canaday | |
| 2020/0282291 A1 | 9/2020 | Heil | |

FOREIGN PATENT DOCUMENTS

| | | |
|---|---|---|
| DE | 102016005714 A1 * | 11/2017 |
| EP | 1449568 A1 | 8/2004 |
| WO | 2006082070 A1 | 8/2006 |

* cited by examiner

SNOWBOARDS, SKIS AND METHOD OF MANUFACTURING SAME

FIELD OF THE INVENTION

The present invention relates generally to snowboards, skis, splitboards and other gliding boards (each collectively referred to herein as a "snowboard" for ease of reference), and more particularly, to a method of manufacturing snowboards.

DISCUSSION OF RELATED ART

Snowboard, skis, and the like are commonly manufactured in a process that involves joining together a plurality of individual layers into a unitary laminated snowboard body. For example, one conventional method of making snowboards uses a mold/cassette made from a relatively thick aluminum plate that has a cavity shaped to correspond to the desired finished shape of the snowboard to be manufactured. In a typical construction, a base layer of the snowboard is placed in the mold and then separate snowboard edge members (typically steel or brass) are placed in the mold at the outer perimeter, if desired. Typically, epoxy resin is then supplied into the mold (e.g., by brushing/painting on the epoxy) to wet the base layer and edge members. Layers of fiberglass (or carbon fiber, Kevlar, basalt, flax or other composite fibers) wet with resin are then laid into the mold. A core, pre-cut typically from wood, is then laid on top in the mold and more epoxy resin is supplied into the mold on the core, and then at least one more layer of fiberglass, etc. is laid on top of the core. More epoxy is then applied to the added layer(s) of fiberglass, etc., and a top sheet layer (which may have decorative graphics that will be the visible top layer of the finished snowboard) is laid on the top in the mold. The mold with the assembly of layers and epoxy resin therein is then cured in a conventional molding process that fixes the layers together in a laminated structure. By way of example, suitable conventional molding processes include a compression molding process, in which the mold is typically placed in a press under elevated temperature and pressure to cure the resin, or using an infusion or vacuum bagging process. Any suitable molding process may be used, as will be appreciated by those skilled in the art. As part of the molding process, the layers of the snowboard are often provided with a 3-D camber, rocker or hybrid (combined) side profile (e.g., an upward and/or downward curve of a central portion of the snowboard, as viewed from the side), an upward curve of the nose (as viewed from the side), and/or an upward curve of the tail (as viewed from the side), etc. The molding process serves to permanently bond together the multiple individual layers of the snowboard structure, and form a unitary laminated snowboard structure.

When the cured assembly is removed from the mold, the product is very rough. Additional finish steps are typically required to form the finished snowboard product from the final snowboard assembly that exits the mold/press. The finishing process is very labor intensive (and thus expensive). Typically, a band saw is first used to cut the fiberglass and epoxy that has squeezed out between the laminated snowboard layers. Then, many (e.g., up to twenty) sanding processes are typically used to place the base layer/bottom surface of the boards in a final finished state. This involves the removal of material from the cured assembly to compensate for local concavities and/or convexities resulting from the assembly of various parts, epoxy "squeeze-through" to the bottom surface of the snowboard, and irregularities in the layers and/or resulting from the pressing/curing process that prevent the cured board assembly from having a flat bottom surface that has a desirable level of smoothness, continuity of curvature or other shape, consistency in surface and/or thickness, etc. free from unintended local concavity, convexity and/or other irregularities resulting from the manufacturing process (collectively referred to herein as "surface consistency"). In some cases, the desired surface consistency may be "flat" in one or more directions (e.g., in the transverse direction), which as used herein, means predominantly flat within a modest tolerance generally known in the art, such as about 0.6 mm or less of variation from a flat plane along the surface of the snowboard. The desired surface consistency, as used herein, may also be non-flat in one or more directions (e.g., in the transverse direction), and includes a surface having a desired continuous curvature (in at least one direction) or desired regional flatness (in at least one direction) that does not deviate from the desired continuous curvature or desired regional flatness by more than a desired modest tolerance, e.g., such as about 0.6 mm or less. Any suitable tolerance may be used, as desired.

Conventional finishing equipment is designed to sand (e.g., using a sanding belt) or grind (e.g., using a grinding stone) the bottom of a board flat, as viewed in transverse cross-section, relative to a direction of elongation of the snowboard. This is due to the configurations of such equipment, which often involve a pressure/feed wheel (on top) spaced from a grinding wheel/sanding belt/drum (bottom) that are narrowly spaced to create a "nip" in which there is pinch roller contact (i.e., an abrasive working region) in a lateral line (transversely) across the surface of a board as it passes between the wheels in a direction of elongation of the snowboard. While this arrangement allows the abrasive working region to accommodate nose/tail bends and camber/rocker curvature (in the direction of elongation of the snowboard), it is designed to work with base surfaces that are flat laterally, across the width of the board, transversely to the direction of elongation. Accordingly, finishing a cured board assembly that has a bottom surface with a convexity extending in the transverse direction is very difficult, if not impossible, on existing sanding/grinding equipment, and may lead to large variations in base layer thickness (typically due to thinning at the crest of the convexity relative to thicker/original thickness toward the lateral edges) and excessive base layer material removal (in the attempt to attain the desired level of surface consistency) that leads to the entire snowboard becoming unusable waste. Finishing a cured board assembly that has a bottom surface with a concavity extending in the transverse direction is generally not possible with existing sanding/grinding equipment.

Additionally, it is noted that it may be desirable to develop snowboards having a "structured" base—one that has a base layer having a deliberate overall concave, convex or other non-flat surface, as viewed in the transverse direction (e.g., cross-section), that is intended to remain in the finished product, but that nevertheless is itself free of local concavities and/or convexities or other irregularities in the manufacturing process. Accordingly, in such embodiments, it is desirable for the finished product to have a concave or convex (or other non-flat) base layer bottom surface that has a desirable level of surface consistency. As noted above, finishing a cured board assembly that has a concavity or convexity extending in the transverse direction is very difficult, if not impossible, on existing sanding/grinding equipment, making it generally unworkable to provide a desirably smooth sanded/base ground/stone ground on a structured base.

Accordingly, what is needed is a method of manufacturing snowboards that provides a finished/cured snowboard assembly having a desirable level of surface consistency, and that reduces or eliminates post-curing sanding/grinding of the cured snowboard assembly, to eliminate regional concavities/convexities resulting from the manufacturing process, that may result in the entire snowboard becoming unusable waste.

SUMMARY

The present invention provides a snowboard, and a method of making a snowboard. The method of making the snowboard involves: preparing a base sub-assembly by bonding at least one edge member, positioned adjacent a peripheral edge of a base layer, the base layer having a top surface and a bottom surface, to the base layer by bonding a stabilizing layer to the top surface of the base layer and to the at least one edge member in a first molding process; finishing the bottom surface of the base layer to provide a desired surface consistency; and preparing a final snowboard assembly by bonding at least one additional layer to the top surface of the base sub-assembly in a second molding process.

BRIEF DESCRIPTION OF THE FIGURES

An understanding of the following description will be facilitated by reference to the attached drawings, in which.

DETAILED DESCRIPTION

The present invention provides a novel method manufacture of snowboards, skis and other gliding boards (collectively referred to herein as "snowboards" in non-limiting fashion, for ease of reference only). The method reduces or eliminates the need for post-curing sanding/grinding of the cured snowboard final assembly to eliminate undesired regional concavities/convexities in the base/bottom surface resulting from the manufacturing process, which in conventional manufacturing processes may result in the entire snowboard becoming unusable waste. Further, the method provides finished snowboards and cured final snowboard assemblies having a desirable level of base/bottom surface consistency (free from unintended local concavity, convexity or other irregularities typically resulting from conventional manufacturing processes). Further still, the method provides finished snowboards having a base/bottom surface having desirable surface consistency, including bottom surfaces that have been sanded, ground, and/or stone-ground, not only for those snowboards that are flat in a direction transverse to a direction of elongation of the snowboard, but also for those snowboards that are non-flat (e.g., concave, convex, or otherwise curved or non-flat) in the transverse direction. Still further, the present invention provides snowboards that have a novel construction, and may be manufactured to have a thinner base layer that reduces the amount of manufacturing waste, reduces the amount of raw materials required for manufacture, and can result in a lighter finished snowboard product, which is often desirable.

Figure 1:
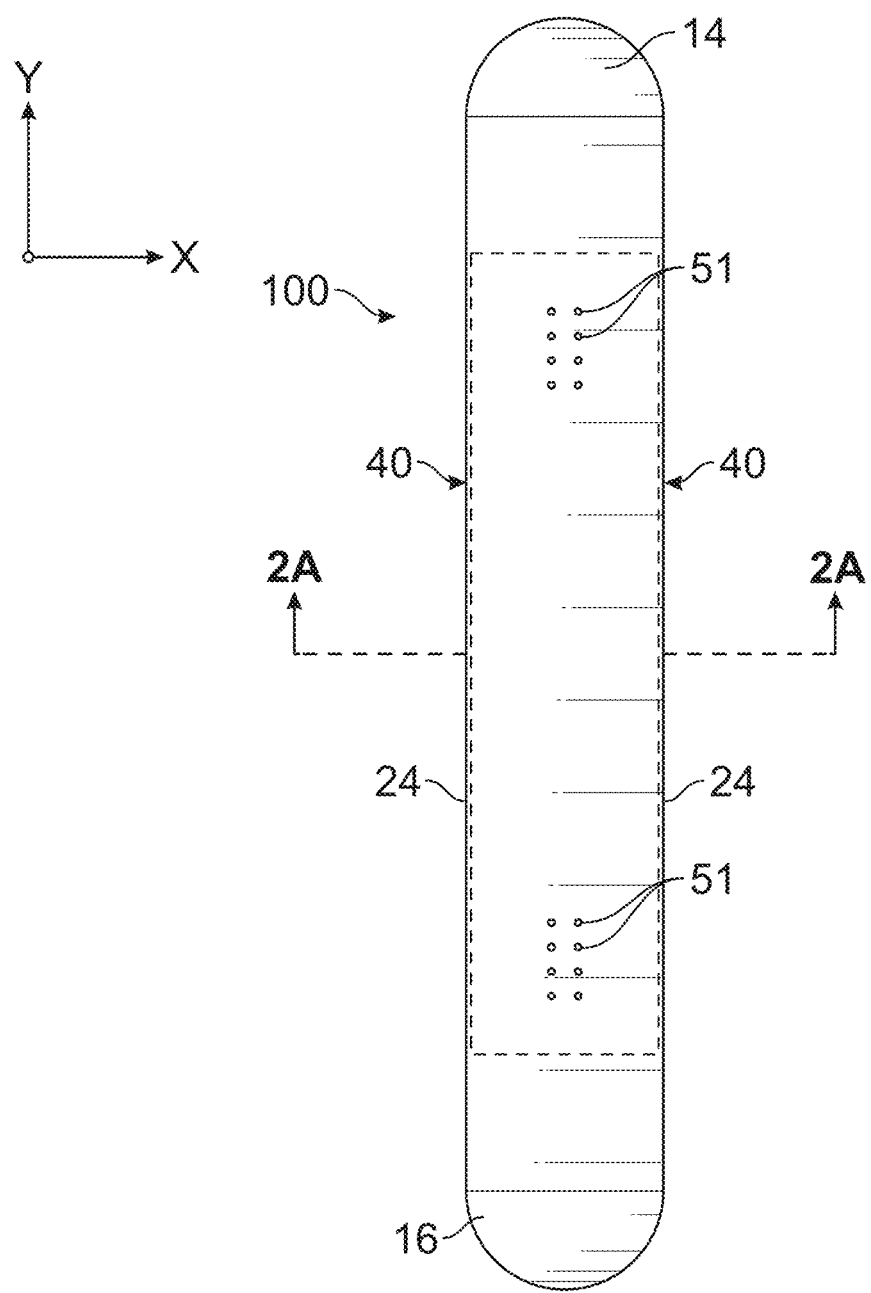
FIG. 1 is a top plan view of an exemplary finished snowboard constructed in accordance with an exemplary embodiment of the present invention, having a flat base.
Figure 2A:
FIGS. 2A and 2B are side and rear views, respectively of the exemplary finished snowboard of FIG. 1.
Figure 2B:
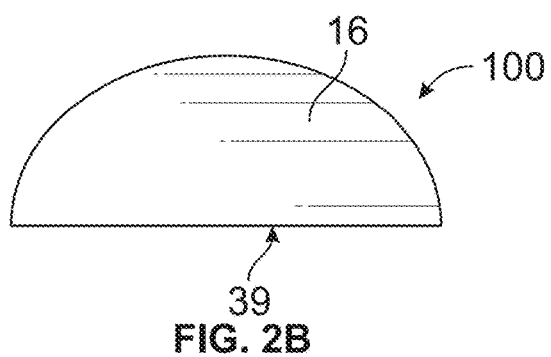
Figure 2C:
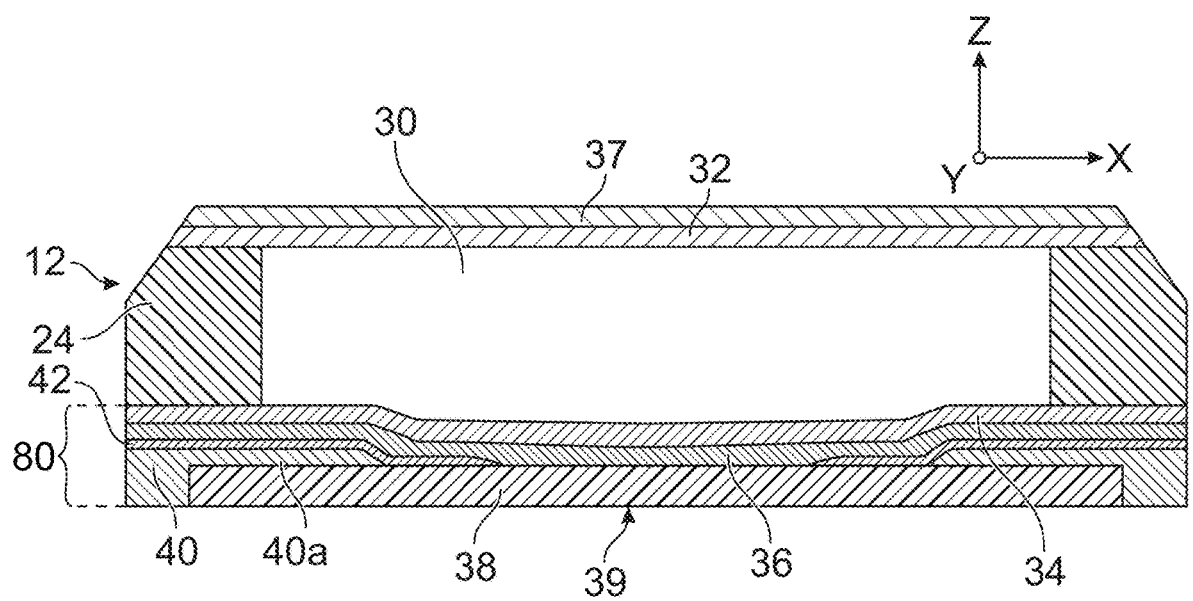
FIG. 2C is a transverse cross-section, taken along line 2A-2A of FIG. 1 showing that the base is flat in the transverse direction.

Referring now to FIGS. 1-2C, an exemplary finished snowboard 100 constructed in accordance with an exemplary embodiment of the present invention is shown. In certain respects, the exemplary snowboard 100 has a generally conventional construction, in that it has a body that is elongated in the longitudinal direction (Y-direction, as shown in FIG. 1), and has a central portion 12, nose portion 14 and a tail portion 16. Further, consistent with the present invention, the exemplary nose portion 14 and/or tail portion 16 bend upwardly in the longitudinal direction, with increasing distance from the central portion 12, as is known in the art, as best shown in FIGS. 2A and 2B. Additionally, consistent with the present invention, the central portion 12 may bow upwardly in the longitudinal direction (commonly referred to as a camber profile), or may bow downwardly in the longitudinal direction (commonly referred to as a rocker profile) with increasing distance from the central portion 12 (or a combination of both, referred to as a hybrid profile), as known in the art, although a longitudinally flat (in side profile) central portion 12 is shown in FIG. 2A for ease of illustration. Flat, as used herein, does not mean flat in an absolute sense, but rather means flat within acceptable tolerances, and desirably flat, without intended deviation from flatness for the purpose of providing a non-flat surface for structural, performance, or appearance effects, and thus generally flat as viewed by the naked eye.

Further, consistent with conventional snowboard construction, the snowboard 100 includes an outer edge 40, which may be constructed of steel, brass, etc., as known in the art. Longitudinally-extending portions of the outer edge 40 are defined at least along each side of the central section 12 of the board. Further still, consistent with conventional snowboard construction, the snowboard 100 includes a core 30, which may be constructed of wood, polyurethane foam or other known core materials. The exemplary core 30 extends the full width of the snowboard except for the width of the sidewall members 24.

Further still, consistent with conventional snowboard construction, the core 30 is sandwiched between upper and lower reinforcement layers 32, 34, which abut the upper and lower surfaces of the core 30 and become impregnated with resin that is cured during manufacture to provide structural reinforcement to the core 30 and finished snowboard 100, as known in the art. The upper and lower reinforcement layers 32, 34 may be constructed of any conventional material used for this purpose, such as a fiberglass, graphite or Kevlar/carbon fibers arranged in a fabric or mat. Further still, consistent with conventional snowboard construction, the upper reinforcement layer 32 is overlain by a top sheet 39, which is typically imprinted or otherwise provided with decorative graphics that provide the finished snowboard product with its desired finished appearance. The top sheet 39 may be formed of any conventional material known for use for this purpose, such as a polyethylene, urethane, acrylic, Nylon™ polyamid, polybutylene terephthalate, a wood veneer, a separate and additional pre-cured fiberglass layer, the upper reinforcement layer itself acting as a top sheet, etc. Accordingly, in some embodiments, a separate/additional top sheet layer may be excluded from the finished snowboard. In any event, the finished snowboard includes a plurality of layers permanently bonded together into a unitary lamination.

Still further, consistent with conventional snowboard construction, the snowboard 100 further includes a base layer 38. The base layer 38 has a lower surface 39 that is the running surface that abuts the snow, ground, etc., and thus is typically formed of a durable low-friction material, an example of which include ultra-high molecular weight polyethylene. The base layer 38 may be formed of any suitable material. As known in the art, the base layer 38 may be made from a transparent material that can printed (screen printed, sublimated or direct digital printed, e.g., on the bonding side) to add graphics. Further, the base layer 39 may be die-cut with different colored or printed base materials pieces insert into the die-cut areas to create an inlaid graphic. This latter configuration in particular is susceptible to epoxy/resin migrating through the joints between the pieces in the layer, and the parts may have different thickness or sit out of plane, which creates an uneven bottom surface particularly in need of sanding/grinding after pressing/curing, to provide a desirably consistent bottom surface.

Additionally, in accordance with the present invention, the snowboard 100 includes a stabilizing layer 36, which is added in accordance with the present invention during construction of a base sub-assembly that is later used in manufacturing the final snowboard assembly 90 that is finished to produce the final snowboard product 100, as described in greater detail below. Thus, in the preferred embodiment, the exemplary snowboard 100 in accordance with the present invention is constructed from top to bottom, of a (typically decorative) top sheet 39, which overlies and is permanently joined to an upper reinforcement layer 32, which overlies and is permanently joined to the core 30, which overlies and is permanently joined to the bottom reinforcement layer 34, which overlies and is permanently joined to a stabilizing layer 36 (of a previously-constructed base sub-assembly), which overlies and is permanently joined to the base layer 38 (of the previously-constructed base sub-assembly), and to the (typically metal) edge members 40 (of the previously-constructed base sub-assembly) providing a sharp edge for cutting into snow. The edge members 40 are preferably mounted by a flange 40*a* that is received between the base 38 and stabilizing layer 36, and in this embodiment, by a bonding foil 42, such as a rubber foil, applied over the edge members 40 and the base 38. As known in the art, the bonding foil 42 is general constructed of a resilient material, and serves to improve the bond between the edge 40 and base 38, and to resist post-curing delamination of the edge 40 and base 38.

Notably, this exemplary embodiment has a base surface 39 that is flat (i.e., generally visibly flat as described above, without significant and/or deliberate convex or concave curvature, or other intended non-flat profile in the vertical/Z-direction) in a direction transverse to the direction of elongation (the X-direction, as shown in FIG. 1), as known in the art, and as best shown in FIGS. 2B and 2C. As discussed above, a base bottom surface 39 that is flat in the transverse direction is well-suited to sanding/grinding of the bottom surface 39 of the base layer, because the bottom surface 39 is flat in transversely, e.g., as viewed in transverse cross-section, and thus mates well with a flat working region/surface in the "nip" (e.g., between a feed/pressure wheel and sanding belt or grinding surface) of many conventional sanding/grinding machines, as the snowboard is fed through the machine in the longitudinal direction of the snowboard.

Figure 3A:
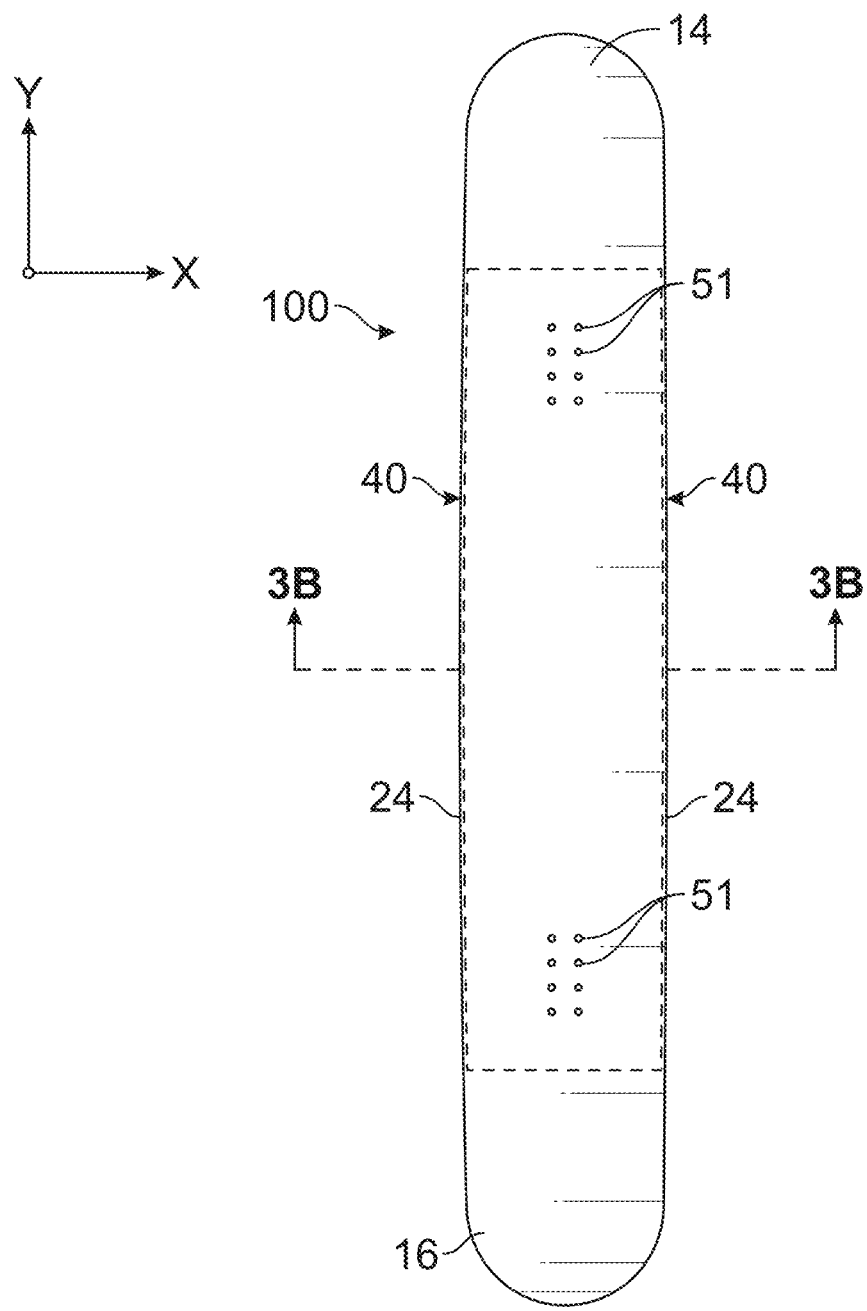
FIG. 3A is a top plan view of an exemplary finished snowboard constructed in accordance with another exemplary embodiment of the present invention, having a curved base.
Figure 3B:
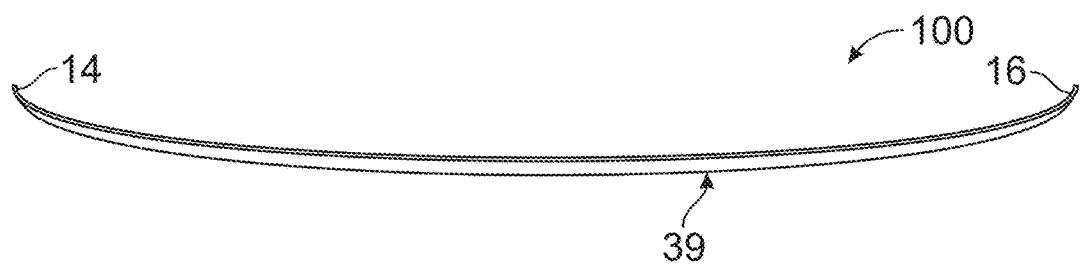
FIGS. 3B and 3C are side and rear views, respectively of the exemplary finished snowboard of FIG. 3.
Figure 3C:
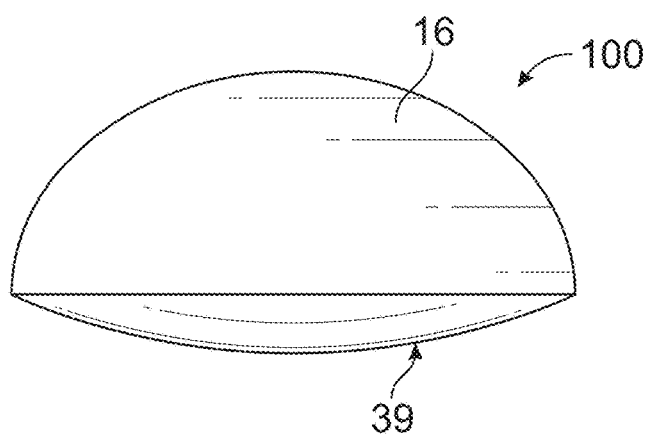
Figure 3D:
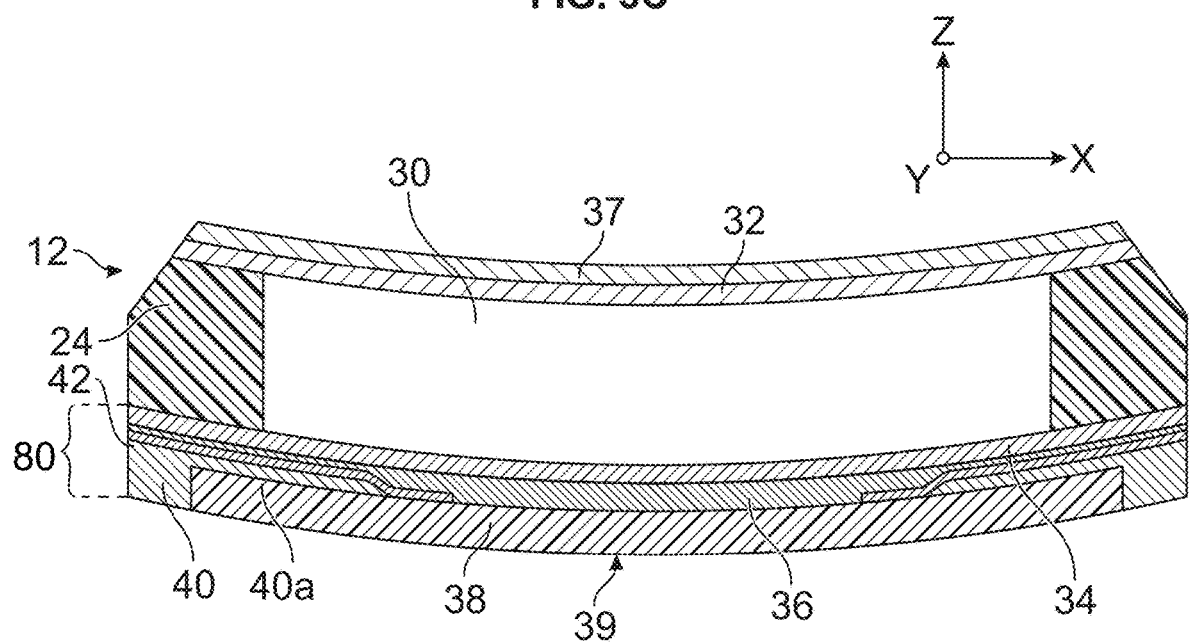
FIG. 3D is a transverse cross-section, taken along line 3B-3B of FIG. 3A showing that the base is curved in the transverse direction.

Referring now to FIGS. 3A-3D, an alternative embodiment of a snowboard 100 in accordance with the present invention is shown. This snowboard is similar to the snowboard shown in FIGS. 1-2C, except that it has a base surface 39 (and base layer 38 and/or other layers) that is not flat, but rather is non-flat, e.g., has a significant and/or deliberate convex or concave curvature, or other intended vertical profile) in a direction transverse to the direction of elongation (the X-direction, as shown in FIG. 1), as known in the art, and as best shown in FIGS. 3C and 3D. As discussed above, a base bottom surface 39 that is not flat, e.g., that is curved/concave/convex/other otherwise non-linear, in the transverse direction is generally not well-suited to sanding/grinding, because curved bottom surface 39 does not mate well with a flat working region in the "nip" of many conventional sanding/grinding machines, as the snowboard is fed through the machine in the longitudinal direction of the snowboard. Accordingly, it is generally difficult if not impossible to sand/grind a base surface that is non-flat (transversely) in a typical sanding/grinding machine or process to obtain the desired surface consistency that the sanding/grinding is intended to provide.

Accordingly, the present invention involves manufacture of a base sub-assembly 80, so that the base sub-assembly 80 can be sanded/ground by a conventional sanding/grinding machine or process to obtain the desired surface consistency (e.g., a sanded and/or stone-ground finish) of the base's bottom surface 39 that the sanding/grinding is intended to provide, prior to mating the base sub-assembly 80 with other layers of the snowboard to form the finished snowboard product. Preferably, the base sub-assembly 80 is formed to be flat in the transverse direction, (and optionally in the longitudinal direction) to facilitate sanding/grinding in a conventional sanding/grinding machine. Alternatively, however, the base sub-assembly 80 may be formed to be nearly-flat, or non-flat in the transverse direction (and optionally in the longitudinal direction), and may nevertheless be sanded/ground by a conventional sanding/grinding machine or process to obtain the desired surface consistency on the bottom surface 39 that the sanding/grinding is intended to provide, provided that the base sub-assembly 80 is sufficiently flexible to be temporarily deflected/flattened in the "nip" of the sanding/grinding machine during sanding/grinding of the base's bottom surface 39, after which the base sub-assembly 80 may resile to its original state. This is feasible for the base sub-assembly 80 as disclosed herein, but is not feasible for a finished snowboard assembly including the other relatively rigid typical snowboard layers, particularly after the snowboard layers and epoxy resin have been cured, e.g., in a compression molding process in which the layers are subjected to elevated temperature and/or pressure conditions for curing purposes, e.g., in a heat/compression press/oven. In any event, the base sub-assembly 80, whether manufactured to be flat or non-flat, may be subsequently mated with other layers and may be formed in a molding process to produce a final snowboard having either a flat or a non-flat base bottom surface 39 (in the transverse direction, and optionally in the longitudinal direction), as desired.

Figure 4:
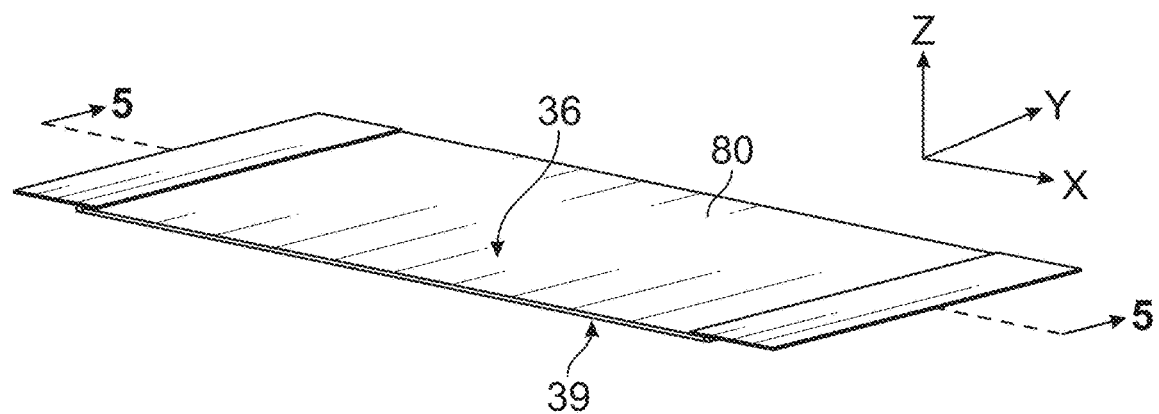
FIG. 4 is a perspective view of a partial portion of an exemplary base sub-assembly of the finished snowboard of FIG. 1, prepared in accordance with the present invention.
Figure 5:
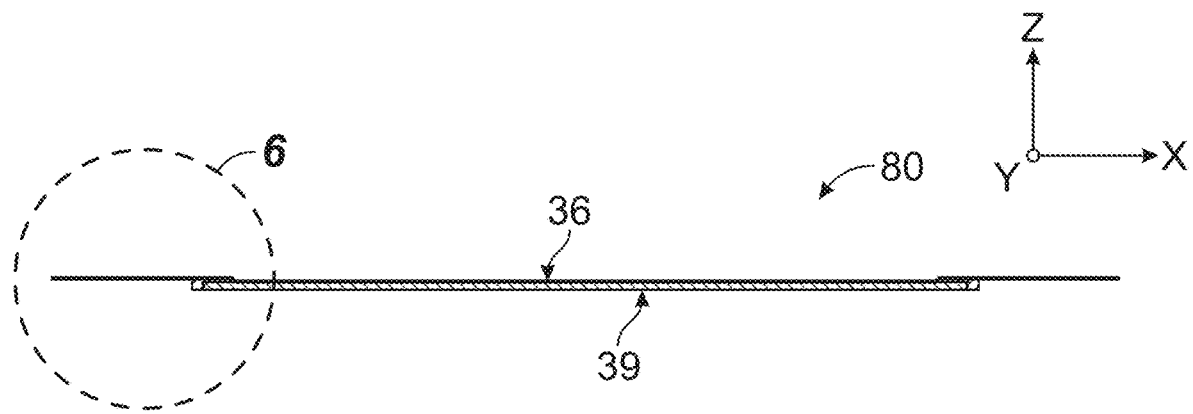
FIG. 5 is a transverse cross-sectional view of the base sub-assembly of FIG. 4, taken along line C-C' of FIG. 4.
Figure 6:
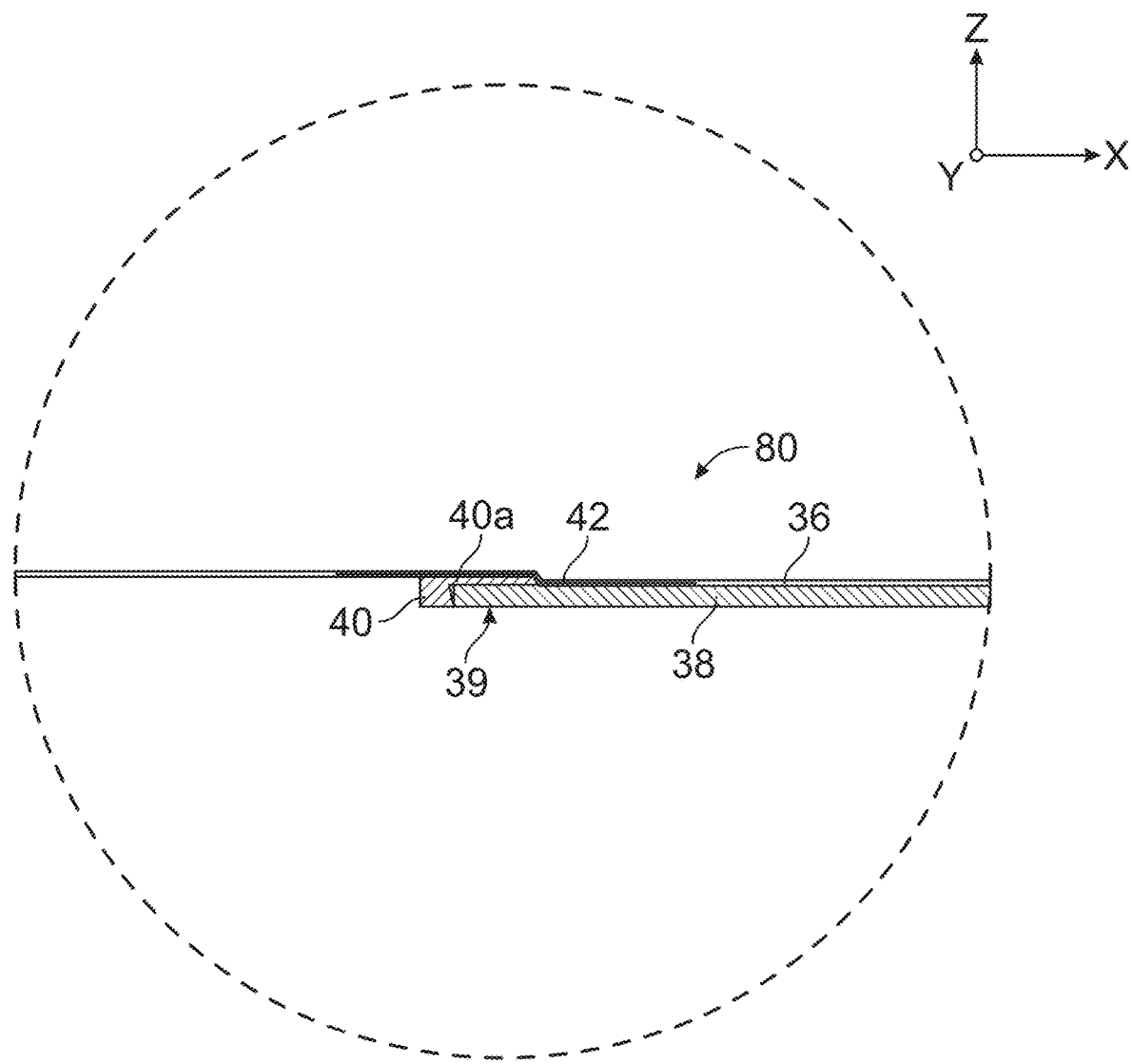
FIG. 6 is an enlarged detail view of region W of FIG. 5.
Figure 7:
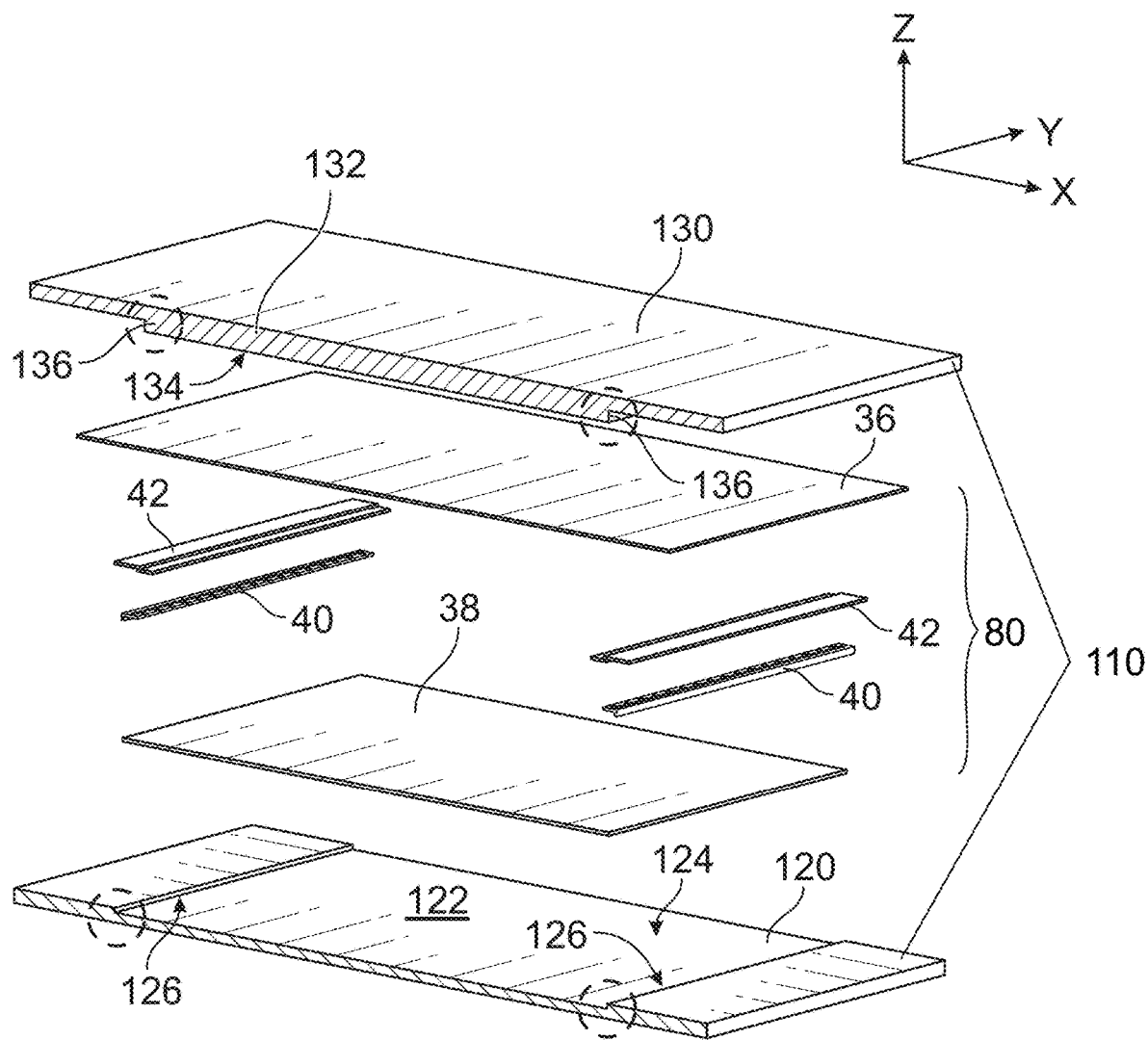
FIG. 7 is an exploded perspective view of a partial portion of the component elements of the base sub-assembly of FIG. 4, shown in relation to exemplary base sub-assembly tooling for manufacturing the base sub-assembly of FIG. 4.

Referring now to FIGS. 4-6, a partial portion of an exemplary base sub-assembly 80 of the finished snowboard 100 of FIG. 1 is shown. FIG. 7 is an exploded perspective view of a partial portion of the component elements of the base sub-assembly 80 of FIG. 4-6, shown in relation to exemplary base sub-assembly tooling 110 for manufacturing the base sub-assembly 100. As will be appreciated from FIGS. 4-7, the base sub-assembly 80 in accordance with the present invention includes multiple components/layers typically included in a conventional finished snowboard product, such as the base layer 38, bonding foil 42 and edges 40.

In conventional snowboard construction, the edge members 40 are bonded to and/or fixed in place relative to the base layer 38 by the overlying bonding foil 42 and bottom reinforcement layer 34, such as a fiberglass fabric that is coated with epoxy resin then cured during formation of the final snowboard assembly, which is one of two reinforcement layers that sandwich the core in conventional snowboard construction.

In the embodiment shown, the lower/bottom reinforcement layer 34, along with the wood core 30, etc., is added in a later manufacturing step, as discussed below. Accordingly, in accordance with one embodiment of the present invention, an additional layer is added that is not typically included in conventional snowboard construction. In particular, a stabilizing layer 36 is added and included in the finished snowboard, and more particularly, the stabilizing layer 36 is included as part of the base subassembly 80. The stabilizing layer 36 is added on top of the base layer 38, bonding foil 42 and edges 40.

In other embodiments, the added stabilizing layer 36 may be omitted, and the lower reinforcement layer 34 may instead be included in the base subassembly 80 to act as the stabilizing layer 36 on top of the base layer 38, bonding foil 42 and edges 40, as described above, during formation of the base sub-assembly. Accordingly, the lower reinforcement layer 34 need not be added during final snowboard assembly in such an embodiment, because the lower reinforcement layer 34 in such an embodiment is already included in the base sub-assembly 80.

In some embodiments, a separately filler layer may be provided on top of the stabilizing layer 36 (which in some embodiments may be the lower reinforcement layer 34) during formation of the base sub-assembly 80. In such an embodiment, the finished/cured base sub-assembly 80 has a flat upper surface. In such embodiments, the base subassembly tooling 110 may not include a boss on the second/cover portion, but rather may have a flat lower surface for forming a flat upper surface of the base sub-assembly 80. In some embodiments, the lower surface of the core 30 includes a lower boss that effectively acts as such a filler layer (as shown in FIG. 2C). In such embodiments, the core 30 nests within a non-flat upper layer of the base sub-assembly, 80 during final assembly, as best shown in FIG. 2C. In some embodiments, the lower surface of the core 30 is flat (or continuously curved, without a boss), and the base sub-assembly tooling 150 does not include a boss, such that the upper surface of the base-subassembly is formed flat (or continuously curved), as will be appreciated from FIG. 3D. In such embodiments, the stabilizing layer, and its accompanying resin, may effectively vary in combined thickness to account for portions overlying and not overlying the bonding foil 42, etc. to provide a flat (or continuously curved) upper surface of the base subassembly 80 (at least before final assembly), as will be appreciated from FIG. 3D.

In all such embodiments, after formation of the base sub-assembly 80, the remaining required layers of the final snowboard assembly 90 are subsequently mated with the base sub-assembly 80. Accordingly, in some embodiments, the finished snowboard 100 may not include any additional layers not typically included in conventional snowboard construction.

During manufacture of the base subassembly 80, the stabilizing layer 36 is coated with epoxy resin that is cured in a molding process, such that after curing, the stabilizing layer 36 (and resin) serves to secure/fix the edge members 40 to the base layer 38 and bind them together. Additionally, after curing, the stabilizing layer 36 and cured epoxy of the cured base sub-assembly 80 create a barrier to prevent epoxy used in manufacture of the final snowboard assembly 90 from reaching the base layer 38 and/or bottom surface 39 during pressing of the final snowboard assembly. This therefore eliminates the need for post-pressing sanding/grinding of the relatively-more-rigid final snowboard assembly that is typical of a traditional snowboard manufacturing process.

In this exemplary embodiment, as in conventional snowboard construction, the base layer 38 is first placed in the mold/cassette, and then the edges 40 are placed in the mold/cassette, with the flange 40a of the edges overlying the base layer 38. The flange 40a provides mechanical attachment for the epoxy/resin and fiberglass/other layer to grip onto and keep the edge attached to the pressed and cured base layer 38. The bonding foil is applied to overly the base layer and edges 40, including their flanges 40a, so that the bonding foil will allow sufficient shear movement to retain the edges in attachment to the relatively more flexible fiberglass/resin laminate.

The base sub-assembly 80 may be manufactured using a generally conventional molding process, such as in a compression molding method in which elevated temperature and pressure are applied in a conventional heat/compression press, using base sub-assembly tooling 110 in accordance with the present invention. The base sub-assembly tooling 110 may be generally similar to conventional compression or other molding tooling, in that it may include a first/base portion 120, sometimes referred to as a cassette trap, and a second/cover portion 130, sometimes referred to as a cassette lid.

As known in the art, the first/base portion 120 of the base sub-assembly tooling 110 may be formed of metal, and may be generally sheet-like but may define a central cavity 122 dimensioned and shaped to form the base sub-assembly in desired fashion. In the example of FIG. 7, the first/base portion 120 has a cavity 122 defined by a bottom surface 124 and sidewalls 126 spaced to correspond to the width of base layer 38 and edge members 40 intended to be used to form the base sub-assembly 80. Further, the exemplary bottom surface 124 is flat (in the transverse direction, i.e., in the X-direction shown in FIG. 7) for forming a flat (transversely) base sub-assembly 80. It will be appreciated that in other embodiments, the bottom surface 124 may be non-flat, e.g., concave or convex (in transverse direction, i.e., in the X-direction shown in FIG. 7), if desired. As known in the art, the second/cover portion 130 may be formed of metal, and may be generally sheet-like but may define a central boss 132 dimensioned and shaped complementarily to the cavity 122 of the first/base portion 120, to form the base sub-assembly 80 in the desired fashion. In the example of FIG. 7, the second/cover portion 130 has a boss 132 defined by a bottom surface 134 and shoulders 136 spaced to correspond to the width of cavity 122 defined by the sidewalls 126 of the first/base portion 120. It should be noted, however, that in other embodiments, the boss 132 may be omitted, e.g., the second/cover portion may instead be flat.

As will be appreciated from FIGS. 4-7, the base sub-assembly 80 may be manufactured as follows. First, the base sub-assembly materials may be placed in the first/base portion 120 (cassette trap) of the base sub-assembly tooling 110. This may involve first fitting the edge elements 40 to the sides of a sheet of UHMW polyethylene or other material intend to act as the base layer 38 of the finished snowboard, e.g., with the flange 40a of the edge members 40 overlying a portion of the peripheral edge of the base layer 38. This involves positioning the base layer 38 and edge members 40 within the cavity 122 of the first/base portion 120 of the tooling 110, with the edge members 40 abutting or in adjacent relationship with the sidewalls 126 of the first/base portion 120.

In this example, epoxy resin is then applied to the upper/top surface of the base layer 38 and edge members 40. Optionally, the bonding foil 42 is then applied over the members 40 (e.g., their flanges 40a) and the upper surface of the base layer 38.

Next, the stabilizing layer 36, such as a 200 g woven biaxial fiberglass mat, is laid over the base layer 38, preferably covering and overhanding the entire base layer 38. Accordingly, the stabilizing layer 36 spans the cavity 122 of the first/base portion 120 of the tooling 110, and preferably extends beyond the cavity 122, as shown in FIG. 6.

In embodiments in which registration pins will be used for aligning layers of the base sub-assembly 80 and/or subsequently aligning the base-sub-assembly 80 with other layers, the stabilizing layer 36 should be applied to overlie registration pins/sockets, so that they will be fixed in place and be properly positioned for registration purposes. For example, it may be desirable to use registration pins to promote proper alignment of the core 30 and top sheet with the base layer/base sub-assembly, e.g., so that the edges 40 are properly positioned to be used as a guide for a band saw during trimming of the final pressed snowboard assembly.

By way of example, registration holes may be molded into the base sub-assembly, and a final assembly mold may have registration pins for registration with holes in the base sub-assembly.

Additional layers of the fiberglass mat, etc. may be applied over the registration pins/sockets, or elsewhere, if additional strength is desired in these areas.

Figure 8:
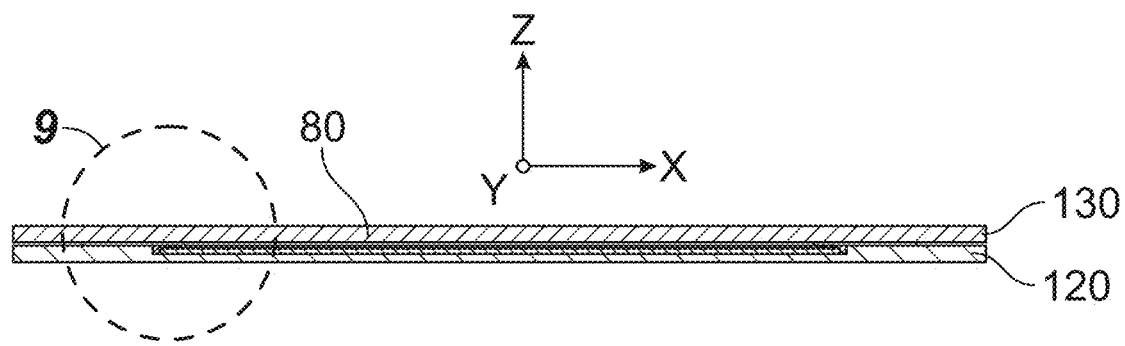
FIG. 8 is a cross-sectional view corresponding to that of FIG. 5, showing the base sub-assembly tooling in a closed position, with the component elements of the base sub-assembly of FIG. 4 positioned within the base sub-assembly tooling.
Figure 9:
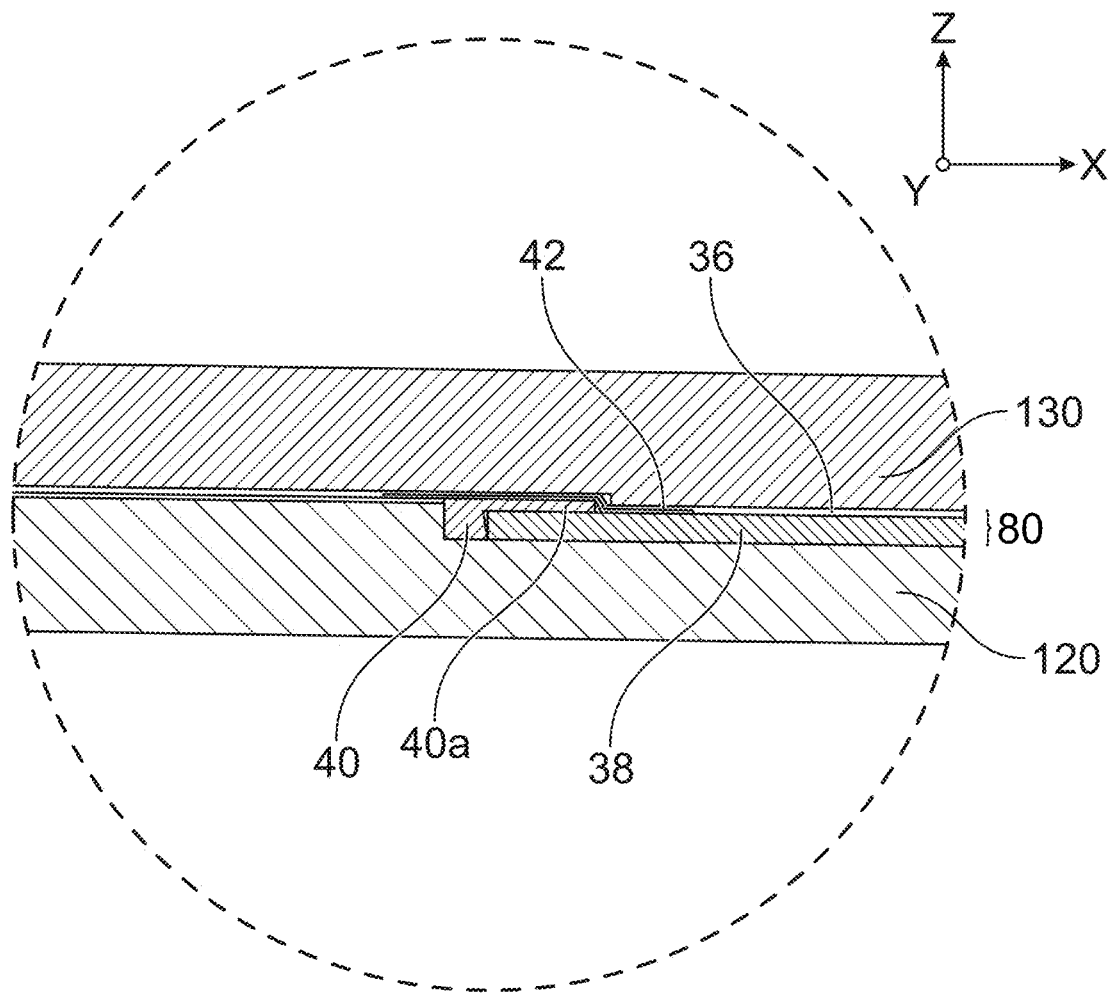
FIG. 9 is an enlarged detail view of region X of FIG. 8.

Epoxy resin is then applied to coat and wet out the stabilizing layer 36, and the second/cover portion 130 of the tooling 110 is mated to the first/base portion 120. This typically includes aligning the central boss 132 of the second/cover portion 130 with the cavity 122 of the first/base portion 120 of the tooling. Optionally, the first and second portions 120, 130 may be taped together or be otherwise secured relative to one another. FIG. 8 is a cross-sectional view corresponding to that of FIG. 5, showing the base sub-assembly tooling 110 in a closed position, with the component elements of the base sub-assembly of FIG. 4 positioned within the base sub-assembly tooling 110, between the first/base portion 110 and the second/cover portion 120. FIG. 9 is an enlarged detail view of region X of FIG. 8.

The entire base sub-assembly tooling 110, thus prepared, may then formed in a suitable molding process. For example, the tooling 110 may be placed in a conventional heat/compression press for a suitable dwell time to allow the epoxy resin to cure, e.g., under elevated temperature and/or pressure conditions in a conventional heat/compression molding process (sometimes referred to herein as "compression" molding). In this example, (due to the structure of the exemplary tooling 110), the finished/cured base sub-assembly thus prepared and cured will be flat in the transverse direction, as will be appreciated from FIGS. 4-6. Alternatively, if desired, the finished/cured base sub-assembly 80 may be non-flat in the transverse direction, if desired (with suitable tooling). Notably, the finished/cured base sub-assembly thus prepared and cured may be flat or non-flat, with any desired curvature, etc. (e.g., a camber, rocker or hybrid profile) in the longitudinal direction (Y-direction in FIG. 4).

After the base sub-assembly 80 has been suitably cured, the base sub-assembly may be removed from the base sub-assembly tooling 110. The base sub-assembly may them be trimmed, e.g., using a band saw and following a scribe line impression on the bottom surface (left by the cassette trap). If desired, a top surface of any registration holes may be ground flush with a handheld angle grinder or the like.

Figure 10:
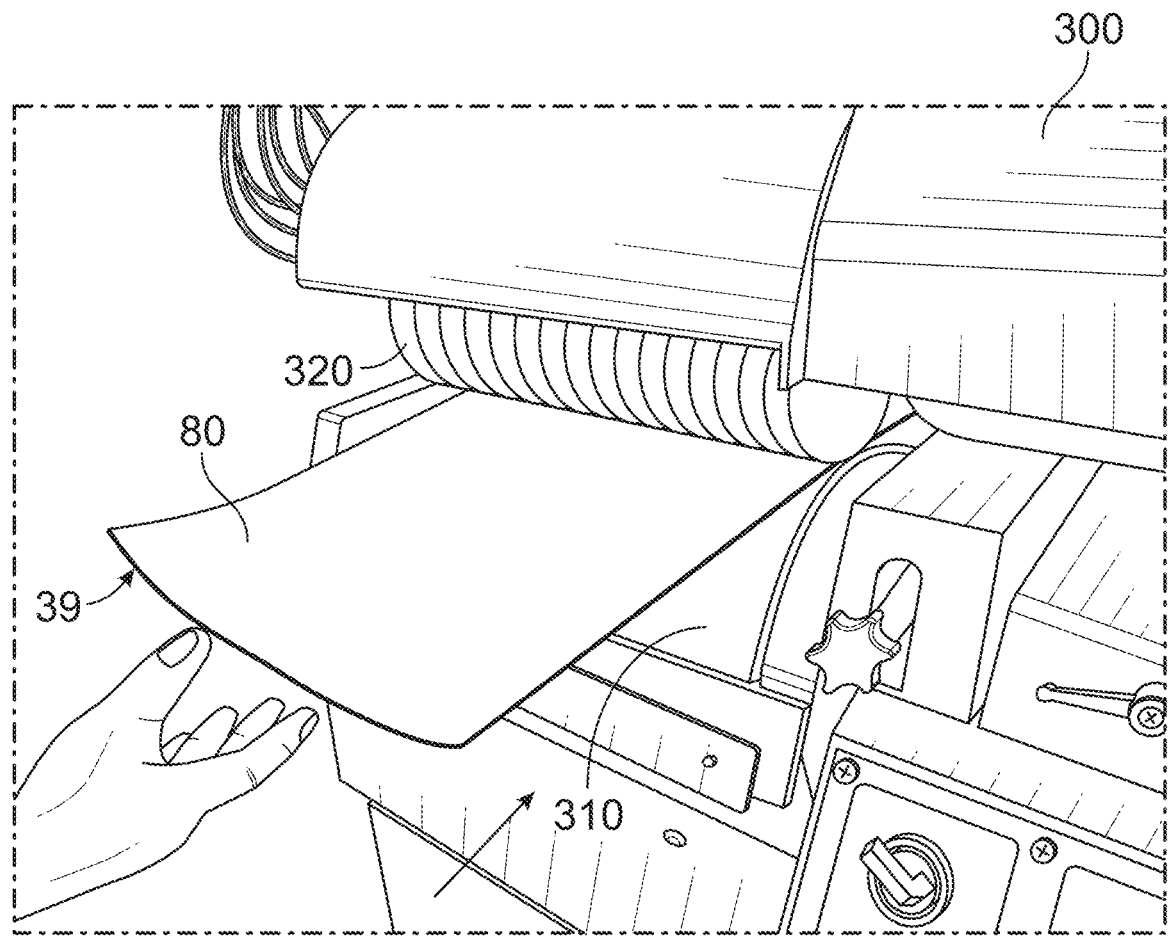
FIG. 10 shows an exemplary base sub-assembly during base finishing in an exemplary sanding machine.

Next, the bottom surface 39 of the base sub-assembly 80 may be finished to have the desired surface consistency. More particularly, the base sub-assembly 80 may be run through (longitudinally) the nip of conventional sanding/grinding equipment, in a generally conventional sanding/grinding/stone-grinding process. FIG. 10 shows an exemplary base sub-assembly 80 during finishing in an exemplary conventional sanding machine 300, with the lower surface 39 of the base layer 38 of the base sub-assembly 80 abutting a sanding belt 310 of the sanding machine 300, with the base sub-assembly 80 passing longitudinally through a nip region that is generally rectangular in transverse cross-section, and is defined between a flat working edge/region of the sanding belt 310 and an upper feed/pressure wheel 320 of the sanding machine 300. Accordingly, the lower surface 39 of the base sub-assembly 80 is ground/sanded flat (and free from any local concave/convex irregularities) as the snowboard is fed through the machine in the longitudinal direction of the snowboard, as will be appreciated by those skilled in the art.

Accordingly, local concavities/convexities or other undesirable irregularities resulting from the manufacturing process can be removed from the bottom surface 39, and a very consistent, irregularity-free base layer 38 bottom surface 39 may be provided. Notably, fewer irregularities are expected because the base sub-assembly 80 has fewer layers and has more even pressure across the surface area, as compared to a traditional snowboard construction that is molded into its final three-dimensional form in a single molding process, and further, any irregularities present can be removed with minimal loss of base layer 38 material because the base subassembly is flexible (relatively to a finished cured snowboard assembly) and can more easily conform to the nip of the base sanding/grinding equipment. Further, because the base sub-assembly comprises the prescribed layers, the base sub-assembly is more flexible than an entire finished snowboard assembly. Accordingly, irregularities extending transversely may be readily eliminated. Further still, even if the base sub-assembly is deliberately constructed to have a bottom surface 39 that is not flat in the transverse direction, any such irregularities may nevertheless be eliminated in this sanding/grinding processing of the base sub-assembly, as the base sub-assembly 80 will be temporarily pressed flat in the nip of such sanding/grinding equipment, to allow for the base's bottom surface 39 to be ground flat at the nip, even though the base sub-assembly 39/bottom surface 39 may subsequently resile after exiting the nip and resume its non-flat configuration in the transverse direction. Accordingly, it is possible by way of the inventive process to provide a finished snowboard product having a sanded/ground/stone-ground bottom surface 39, even if the finished snowboard product has/will have a base bottom surface 39 that is not flat in the transverse direction.

If desired, quality control, edge sealer application and other similar conventional process may be performed (or be adapted to be performed) on the base sub-assembly, as will be appreciated by those skilled in the art.

Figure 11:
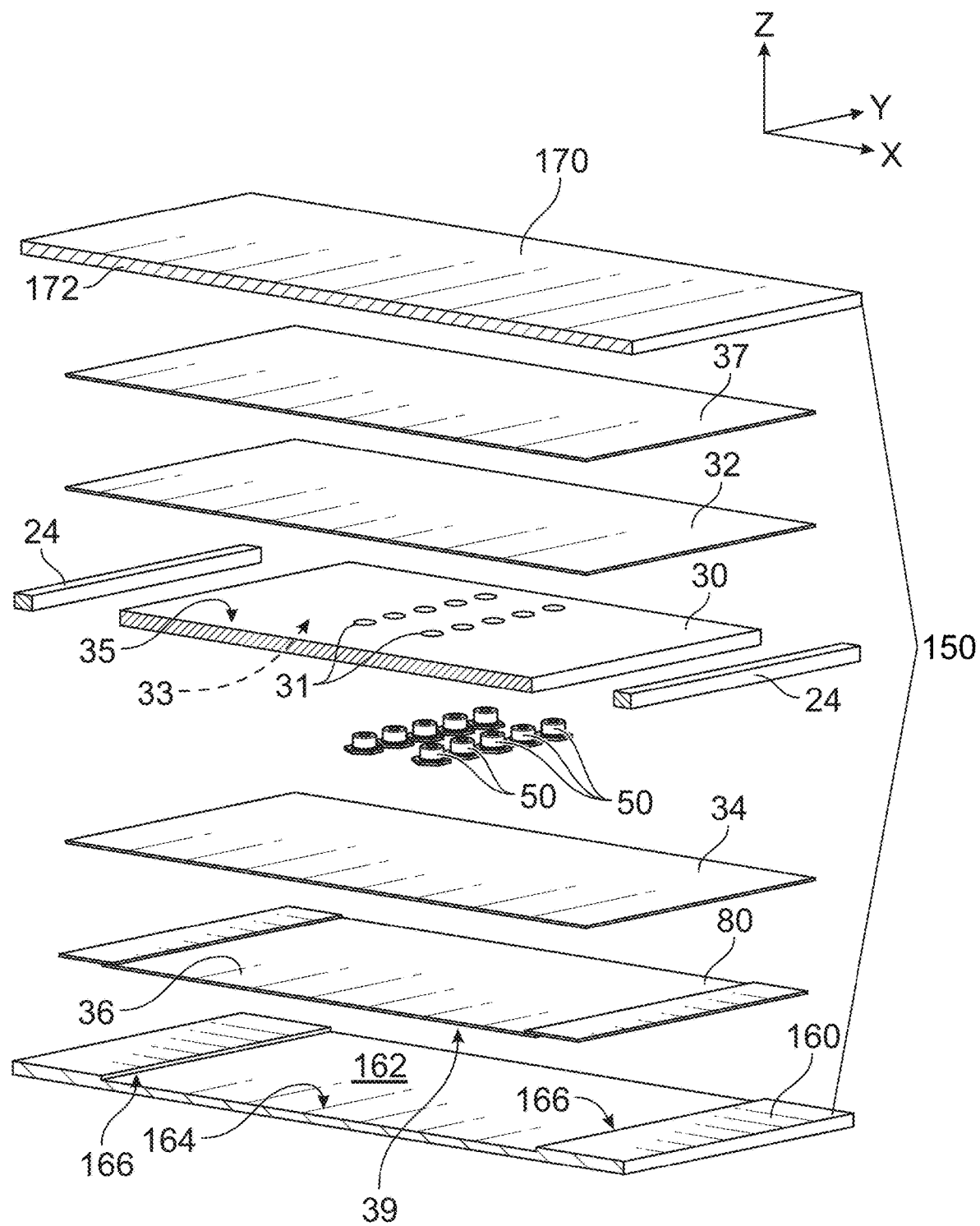
FIG. 11 is an exploded perspective view of the component elements of the snowboard of FIG. 1, shown in relation to exemplary final assembly tooling for manufacturing the finished snowboard of FIG. 1.

In a subsequent manufacturing step, the base sub-assembly 80 may be mated with other layers to form a final snowboard assembly 90, and eventually, a finished snowboard 100. More particularly, a final snowboard assembly 90 may be manufactured using a generally conventional molding process and final assembly tooling 150, in accordance with the present invention, to mate the base sub-assembly 80 with additional layers/component elements of the snowboard. FIG. 11 is an exploded perspective view of the component elements of the snowboard 100 of FIG. 1, shown in relation to exemplary final assembly tooling 150 for manufacturing the finished snowboard 100 of FIG. 1. The final assembly tooling 150 may be generally similar to conventional molding tooling, in that it may include a first/base portion 160 (cassette trap), and a second/cover portion 170 (cassette lid). The final assembly tooling 150 is different from the base sub-assembly tooling 110 in that it is designed to accommodate different layers. Additionally, the final assembly tooling 150 may define an internal cavity structure (collectively defined by the first base/portion 160 and second/cover portion 170) different from that of the base sub-assembly tooling 110, namely, to produce a final snowboard assembly 90 and finished snowboard 100 having the desired three-dimensional shape, which may include a curved/non-flat bottom surface 39 (in one or both of the transverse and longitudinal directions), even if the base sub-assembly tooling 110 may be configured to produce a base sub-assembly 80 having a flat bottom surface 39 (in one or both of the transverse and longitudinal directions).

As known in the art, the first/base portion 160 of the final assembly tooling 150 may be formed of metal, and may be generally sheet-like but may define a central cavity 162 having a bottom surface 164 dimensioned and shaped to form the final snowboard assembly 90 in desired fashion. In the example of FIG. 11, the first/base portion 160 has a cavity 162 defined by a bottom surface 164 and sidewalls 166 spaced to correspond to the width of base sub-assembly (or the base layer 38 and edge members 40). Further, the exemplary bottom surface 164 is flat in the transverse direction (i.e., in the X-direction shown in FIG. 11) for forming a flat (transversely) final snowboard assembly 90. It will be appreciated that in other embodiments, the bottom surface 164 may be non-flat (e.g., concave or convex) in the transverse direction (i.e., in the X-direction shown in FIG. 11), if desired. Additionally, it will be appreciated that in some embodiments, the bottom surface 164 may be flat in the longitudinal direction (i.e., the Y-direction shown in FIG. 11), or may be non-flat in the longitudinal direction, e.g., concave or convex or otherwise non-flat, e.g., to provide a camber, rocker or hybrid profile, etc.

As known in the art, the second/cover portion 170 may be formed of metal, and may be generally sheet-like. The second cover/portion 170 has a structure and surface configured adapted to produce a final/cured snowboard assembly having a desired three-dimensional configuration. The second cover/portion 170 may (or may not) define a central boss 172 dimensioned and shaped identically or complementarily (e.g., to allow for shaping, varying application of pressure, for pressure relief, or other purposes) to allow to the cavity 162 of the first/base portion 160, to form the final snowboard assembly 90 in the desired fashion.

As will be appreciated from FIGS. 11-15, a final snowboard assembly 90 corresponding to the finished snowboard 100 may be manufactured as follows. First, the base sub-assembly 80 may be placed in the first/base portion 160 (cassette trap) of the final assembly tooling 150, as will be appreciated from FIG. 11. This may involve positioning the base sub-assembly 80 in the cavity 162 with its edge members 40 abutting or in adjacent relationship with the sidewalls 166 of the first/base portion 160.

In embodiments in which registration pins are used for alignment, the base sub-assembly 80 may be positioned such that registration holes of the base sub-assembly fit over and register with registration pins of the first/base portion 160. One or more subsequent layers, and particularly the top sheet, may be similarly positioned with their holes in registration with registration pins on the final assembly tooling 150.

Epoxy resin is then applied to a top surface of the base sub-assembly 80. Next, a bottom reinforcement layer 34, such as a 400 g biaxial fiberglass mat, is laid over the epoxy resin and base sub-assembly 80, preferably covering and overhanging the entire base sub-assembly 80. Accordingly, the bottom reinforcement layer 34 spans the cavity 162 of the first/base portion 160 of the tooling 150, and preferably extends beyond the cavity 162, as shown in FIGS. 11-15. Epoxy resin is then applied to coat and wet out the bottom reinforcement layer 34.

If desired, metal inserts, such as threaded metal inserts 50 may be inserted into corresponding openings 31 defined in a core 30, e.g., for service as attachment points for shoe/boot bindings of the like, as shown in FIG. 11. Optionally, the core 30 may be prepared to join sidewalls 24 as part of the core prior to placement in the final assembly tooling. Alternatively, discrete sidewalls 24 may be inserted alongside the core 30 in the final assembly tooling (with appropriate application of epoxy resin), and may be joined to the core 30 and the rest of the layers during manufacture of the final snowboard assembly 90, as will be appreciated by those skilled in the art. A bottom side 33 of the core 30 may then be wet/coated with epoxy resin, and the core 30 may be placed in/or the first/base portion 160, with the bottom side 33 positioned on the resin atop the bottom reinforcement layer 34.

Next, a top side 35 of the core 30 may be wet/coated with epoxy resin, and then a top reinforcement layer 32, such as a 700 g biaxial fiberglass mat, is laid over the epoxy resin and core 30, preferably covering and overhanging the entire core 30. Accordingly, the top reinforcement layer 32 spans the cavity 162 of the first/base portion 160 of the tooling 150, and preferably extends beyond the cavity 162, as shown in FIGS. 11-15. Epoxy resin is then applied to coat and wet out the top reinforcement layer 32.

Figure 12:
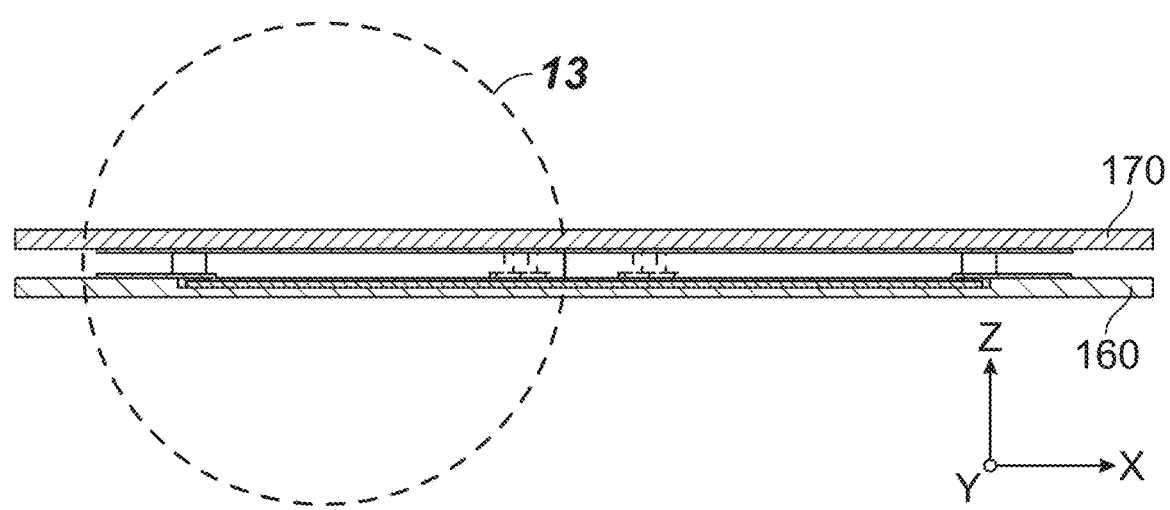
FIG. 12 is a transverse cross-sectional view corresponding to that of FIG. 8, showing the final assembly tooling in a closed position, with the component elements of the finished snowboard of FIG. 1 positioned within the final assembly tooling.
Figure 13:
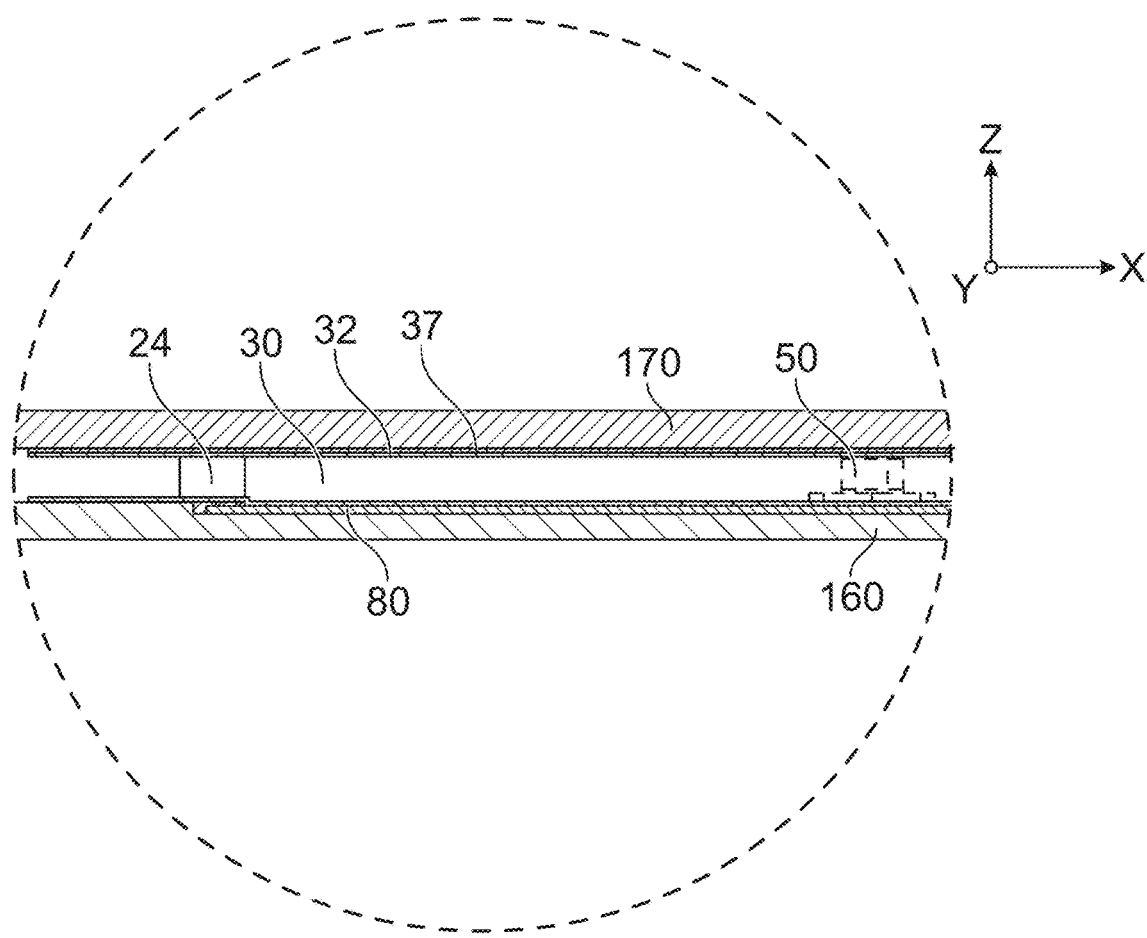
FIG. 13 is an enlarged detail view of region Y of FIG. 8.

Next, the top sheet 37 is positioned to overlie the resin and top reinforcement layer 32, and then the second/cover portion 170 of the tooling 150 is mated to the first/base portion 160. This may or may not involve aligning a central boss 172 of the second/cover portion 170 with the cavity 162 of the first/base portion 160 of the final assembly tooling 150. Optionally, the first and second portions 160, 170 may be taped together or otherwise be secured relative to one another. FIG. 12 is a cross-sectional view corresponding to that of FIG. 5, showing the final assembly tooling 150 in a closed position, with the component elements of the final snowboard assembly 90 positioned within the final assembly tooling 150, between the first/base portion 160 and the second/cover portion 170. FIG. 13 is an enlarged detail view of region Y of FIG. 12.

The entire final assembly tooling 150, thus prepared, may then be molded in a conventional molding process for a suitable dwell time to allow the epoxy resin to cure, e.g., by placement in a conventional press under elevated temperature and pressure in a conventional compression molding process. In this example, (due to the structure of the exemplary final assembly tooling 150), the finished/cured final snowboard assembly 90 thus prepared (including the base sub-assembly and the remaining layers of the plurality of layers that are intended to be used to make the finished snowboard product) and cured will be flat in the transverse direction, as will be appreciated from FIGS. 12 and 13. Alternatively, if desired, the finished/cured final snowboard assembly 90 may be non-flat in the transverse direction (X-direction in FIG. 12), if desired (with suitable tooling). Notably, the finished/cured final snowboard assembly thus prepared and cured may be flat or have any desired curvature (e.g., a camber, rocker or hybrid profile) in the longitudinal direction (Y-direction in FIG. 12).

Figure 14:
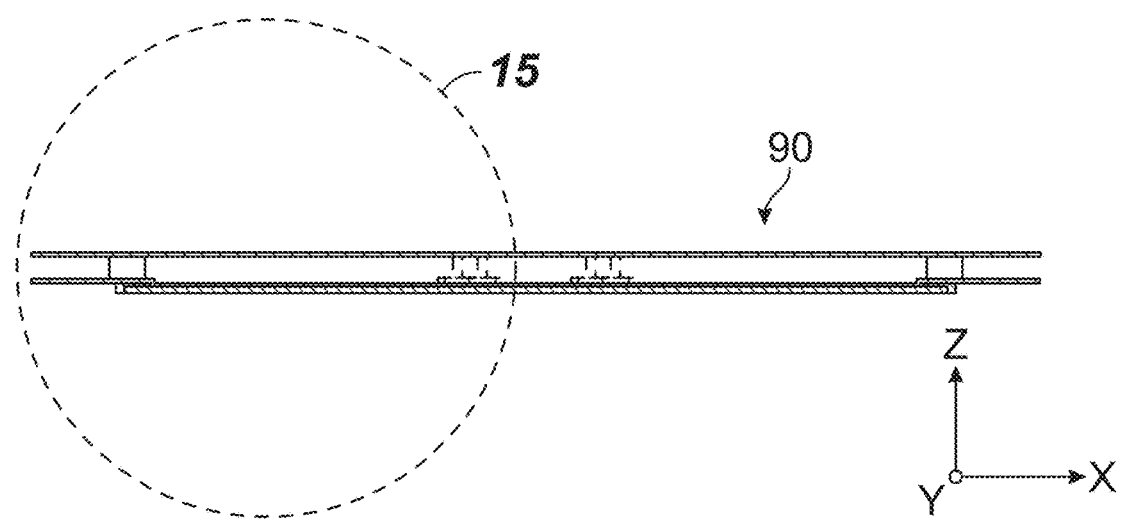
FIG. 14 is a transverse cross-sectional view of final snowboard assembly of the finished snowboard of FIG. 1.
Figure 15:
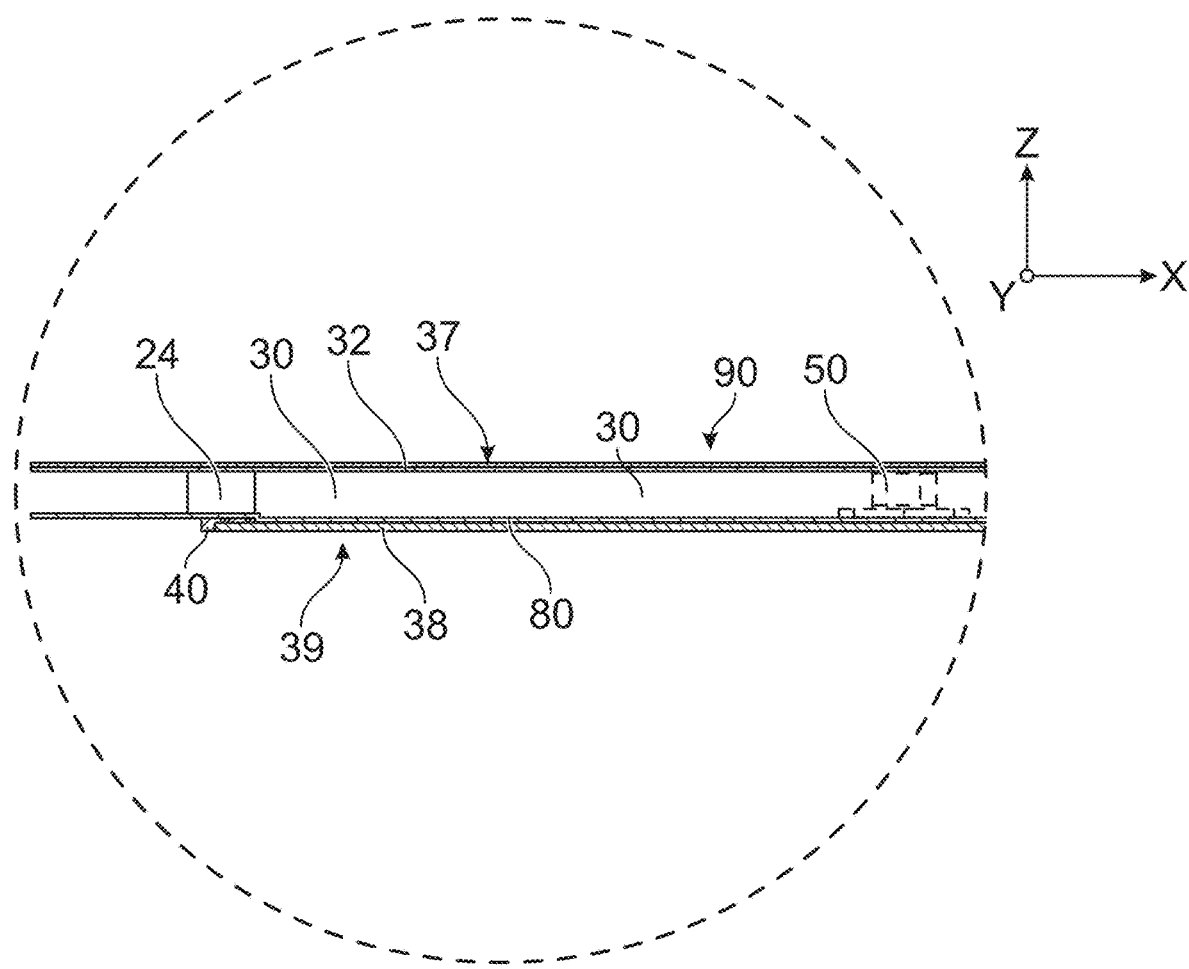
FIG. 15 is an enlarged detail view of region Z of FIG. 14.

After the final snowboard assembly 90 has been suitably cured, the final snowboard assembly 90 may be removed from the final assembly tooling 150, as shown in FIGS. 14 and 15. The final snowboard assembly 90 may then be trimmed, e.g., using a band saw and following the edge members 40 and/or a by a CNC milling/routing machine, following a specific trimming/shape outline path, as appropriate, to partially form the finished snowboard 100. Additional conventional steps may also be performed at this time, such as sanding the snowboard around its perimeter, drilling/opening all inserts, cutting a sidewall angle, apply sidewall print graphics if desired, applying wax to the bottom surface 39 of the base layer 38, etc., to form the finished snowboard 100.

As mentioned above, the examples are provided herein for illustrative and non-limiting purposes only. By way of example, it should be appreciated that although the drawings illustrate an exemplary sandwich construction, in which full layers generally overlap other full layers of material, the present invention also encompasses other constructions, such as cap and semi-cap constructions in which one or more layers may overlie and surround the peripheral edges of one or more other layers.

Notably, the finished snowboard 100 will thus have a bottom surface 39 with a desired surface consistency, such as a consistent sanded/ground/stone-ground surface, free from undesired local concavities/convexities or other irregularities due to the manufacturing process, without the need to sand/grind the final snowboard assembly 90 or finished snowboard 100—because those irregularities were already removed during manufacture of the base sub-assembly 80, and by manufacturing the base-sub-assembly as described, an undesired level of such irregularities is not introduced during manufacture of the final snowboard assembly 90. Notably, this allows for production of snowboards that are flat or that have any desired camber, rocker, nose/tail curvature or any other profile that is not flat in the longitudinal direction, as well as snowboards that are flat or that have any desired non-flat surface in the transverse direction, all with a very smooth, very consistent bottom surface, free from undesirable local concavities/convexities or other irregularities due to imperfections in the manufacturing process, with a desirable sanded/ground/stone-ground base bottom surface 39.

Additionally, because fewer and/or less extreme irregularities are likely to result during manufacture of the base sub-assembly 80, a relatively thinner base layer 38 may be used (because there is a reduced need for the inclusion of excess base layer material to allow for possible removal during sanding/grinding to correct irregularities), which results in a lighter finished snowboard 100, which is desirable. Accordingly, the base layer may be very consistent in thickness over its area, e.g., may not vary over its area by more than about 0.2 mm, due to a lack of a need for extensive or non-uniform sanding/grinding to obtain the desired surface consistency, in accordance with the present invention, which allows for sanding/grinding flat of the base sub-assembly, even for finished snowboards that will be non-flat in the transverse (and if desired, longitudinal) direction(s).

While there have been described herein the principles of the invention, it is to be understood by those skilled in the art that this description is made only by way of example and not as a limitation to the scope of the invention. Accordingly, it is intended by the appended claims, to cover all modifications of the invention which fall within the true spirit and scope of the invention.

What is claimed is:

1. A method of making a snowboard having a plurality of layers, the method comprising the steps of:
    preparing a base sub-assembly in a first compression molding process, comprising:
        a base layer having a top surface, a bottom surface, and a peripheral edge extending therebetween;
        at least one edge member positioned along at least a portion of the peripheral edge of the base layer; and
        a stabilizing layer overlying the base layer and the at least one edge member, said stabilizing layer comprising cured adhesive resin;
        the base layer, the at least one edge member and the stabilizing layer being bonded together by said cured adhesive resin;

finishing the bottom surface of the base layer of the prepared base sub-assembly to a desired surface consistency; and after preparing the base sub-assembly and finishing the bottom surface of the base layer to the desired surface consistency, preparing a final snowboard assembly in a second compression molding process, comprising:

the base sub-assembly, the bottom surface of the base layer having the desired surface consistency; and additional layers of the plurality of layers of the snowboard overlying the base sub-assembly, the additional layers of the snowboard excluding layers of the base sub-assembly, the preparing of the final snowboard assembly comprising bonding, in the second compression molding process, the additional layers to the base sub-assembly that was previously prepared to comprise the base layer having the desired surface consistency, the at least one edge member, and the stabilizing layer overlying the base layer and the at least one edge member.

2. The method of claim 1, wherein preparing the final snowboard assembly comprises providing, as additional layers of the plurality of layers:

a lower reinforcement layer overlying the base sub-assembly;

a core layer overlying the lower reinforcement layer; and an upper reinforcement layer overlying the core layer.

3. The method of claim 2, wherein preparing the final snowboard assembly comprises providing a top sheet overlying the upper reinforcement layer and additional layer of the plurality of layers.

4. The method of claim 1, wherein preparing the base sub-assembly comprises providing a lower reinforcement layer as the stabilizing layer, and wherein preparing the final snowboard assembly comprises providing:

a core layer overlying the base sub-assembly; and an upper reinforcement layer overlying the core layer.

5. The method of claim 4, wherein preparing the final snowboard assembly comprises providing a top sheet overlying the upper reinforcement layer as one of the additional layers of the plurality of layers.

6. The method of claim 1, further comprising trimming excess material from the final snowboard assembly to produce the snowboard.

7. The method of claim 1, wherein preparing the base sub-assembly comprises:

providing base sub-assembly tooling comprising a first cassette defining a cavity having a bottom surface, and a first cover complementary to the first cassette;

positioning the base layer in the cavity of the first cassette;

positioning the at least one edge member along at least a portion of the peripheral edge of the base layer, within the cavity of the first cassette;

positioning the stabilizing layer overlying the base layer and the at least one edge member; and positioning the first cover over the first cassette to place the base-subassembly tooling in a closed position with the base layer, the at least one edge member and the stabilizing layer positioned therebetween; and bonding the base layer, the at least one edge member and the stabilizing layer together.

8. The method of claim 7, wherein bonding the base layer, the at least one edge member and the stabilizing layer together comprises placing the base sub-assembly tooling, in the closed position with the base layer, the at least one edge member and the stabilizing layer positioned therebetween, and with curable resin applied between adjacent ones of the base layer, the at least one edge member and the stabilizing layer, in a press and curing the resin under elevated temperature and pressure.

9. The method of claim 7, wherein providing base sub-assembly tooling comprises providing base sub-assembly tooling having a flat bottom surface that is flat in a direction of elongation and in a direction transverse to the direction of elongation.

10. The method of claim 7, wherein providing base sub-assembly tooling comprises providing base sub-assembly tooling having a non-flat bottom surface that is not flat in at least one of a direction of elongation and a direction transverse to the direction of elongation.

11. The method of claim 7, wherein providing the base sub-assembly tooling comprises providing base sub-assembly tooling having a non-flat bottom surface that is not flat in a direction transverse to a direction of elongation.

12. The method of claim 1, wherein finishing the bottom surface of the base layer to a desired surface consistency comprises at least one of sanding and grinding of the bottom surface of the base layer.

13. The method of claim 1, wherein finishing the bottom surface of the base layer to a desired surface consistency comprises at least one of sanding and grinding of the bottom surface of the base layer by passing the base-sub assembly in a longitudinal direction through at least one of a sanding machine and a grinding machine having a working region, positioned to contact and abrade the bottom surface, that is flat in a direction transverse to the longitudinal direction.

14. The method of claim 1, wherein finishing the bottom surface of the base layer to a desired surface consistency comprises at least one of sanding and grinding of the bottom surface of the base layer by passing the base-sub assembly in a longitudinal direction through at least one of a sanding machine and a grinding machine having a working region, positioned to contact and abrade the bottom surface, that is flat in a direction transverse to the longitudinal direction, and pressing flat the base sub-assembly, the base sub-assembly being non-flat in the direction transverse to the longitudinal direction as it is passed along a working edge of the machine.

15. The method of claim 1, wherein preparing the final snowboard assembly comprises:

providing final assembly tooling comprising a second cassette defining a respective cavity having a respective bottom surface, and a second cover complementary to the second cassette;

positioning the base sub-assembly in the respective cavity of the second cassette;

positioning the additional layers of the plurality of layers of the snowboard overlying the base sub-assembly;

positioning the second cover over the second cassette to place the final assembly tooling in a closed position with the base sub-assembly and the additional layers of the plurality of layers positioned therebetween; and bonding the base sub-assembly and additional layers of the plurality of layers together.

16. The method of claim 15, wherein positioning the additional layers of the plurality of layers of the snowboard overlying the base sub-assembly comprises:

positioning a core layer overlying the base sub-assembly; and positioning an upper reinforcement layer overlying the core layer.

17. The method of claim 16, wherein positioning the additional layers of the plurality of layers of the snowboard overlying the base sub-assembly comprises:
positioning a lower reinforcement layer overlying the base subassembly, and beneath the core layer.

18. The method of claim 16, wherein positioning the additional layers of the plurality of layers of the snowboard overlying the base sub-assembly comprises:
positioning a top sheet overlying the upper reinforcement layer.

19. The method of claim 18, wherein bonding the base sub-assembly and additional layers of the plurality of layers together comprises placing the final assembly tooling, in the closed position with the base sub-assembly and additional layers of the plurality of layers positioned therebetween, and with curable resin applied between adjacent layers, in a press and curing the resin under elevated temperature and pressure in the second compression molding process.

20. The method of claim 15, wherein providing the final assembly tooling comprises providing final assembly tooling having a flat bottom surface that is flat in a direction of elongation and in a direction transverse to the direction of elongation.

21. The method of claim 15, wherein providing the final assembly tooling comprises providing final assembly tooling having a non-flat bottom surface that is not flat in at least one of a direction of elongation and a direction transverse to the direction of elongation.

22. The method of claim 15, wherein providing the final assembly tooling comprises providing final assembly tooling having a non-flat bottom surface that is not flat in a direction transverse to a direction of elongation.

23. A method of making a snowboard comprising the steps of:
preparing a base sub-assembly by bonding at least one edge member, positioned adjacent a peripheral edge of a base layer having a top surface and a bottom surface, to the base layer by bonding a stabilizing layer to the top surface of the base layer and the at least one edge member in a first compression molding process;
finishing the bottom surface of the base layer of the prepared base sub-assembly to a desired surface consistency; and
after preparing the base sub-assembly and finishing the bottom surface of the base layer to the desired surface consistency, preparing a final snowboard assembly by bonding a plurality of additional layers to the top surface of the base sub-assembly in a second compression molding process.

24. The method of claim 23, wherein preparing the base sub-assembly comprises:
providing base sub-assembly tooling comprising a first cassette defining a cavity having a bottom surface, and a first cover complementary to the first cassette;
positioning the base layer in the cavity of the first cassette;
positioning the at least one edge member along at least a portion of the peripheral edge of the base layer, within the cavity of the first cassette;
positioning the stabilizing layer overlying the base layer and the at least one edge member;
positioning the first cover over the first cassette to place the base-subassembly tooling in a closed position with the base layer, the at least one edge member and the stabilizing layer positioned therebetween; and
bonding the base layer, the at least one edge member and the stabilizing layer together.

25. The method of claim 24, wherein bonding the base layer, the at least one edge member and the stabilizing layer together comprises placing the base sub-assembly tooling, in the closed position with the base layer, the at least one edge member and the stabilizing layer positioned therebetween, and with curable resin applied between adjacent ones of the base layer, the at least one edge member and the stabilizing layer, in a press and curing the resin under elevated temperature and pressure in the first compression molding process.

26. The method of claim 24, wherein the providing base sub-assembly tooling comprises providing base sub-assembly tooling having a flat bottom surface that is flat in a direction of elongation and in a direction transverse to the direction of elongation.

27. The method of claim 24, wherein the providing base sub-assembly tooling comprises providing base sub-assembly tooling having a non-flat bottom surface that is not flat in at least one of a direction of elongation and a direction transverse to the direction of elongation.

28. The method of claim 24, wherein the providing the base sub-assembly tooling comprises providing base sub-assembly tooling having a non-flat bottom surface that is not flat in a direction transverse to a direction of elongation.

29. The method of claim 24, wherein finishing the bottom surface of the base layer to a desired surface consistency comprises at least one of sanding and grinding of the bottom surface of the base layer.

30. The method of claim 24, wherein finishing the bottom surface of the base layer to a desired surface consistency comprises at least one of sanding and grinding of the bottom surface of the base layer by passing the base-sub assembly in a longitudinal direction through at least one of a sanding, a grinding and a stone-grinding machine having a working region, positioned to contact and abrade the bottom surface of the base layer, that is flat in a direction transverse to the longitudinal direction.

31. The method of claim 24, wherein finishing the bottom surface of the base layer to a desired surface consistency comprises at least one of sanding and grinding of the bottom surface of the base layer by passing the base-sub assembly in a longitudinal direction through at least one of a sanding, a grinding and a stone-grinding machine having a working region, positioned to contact and abrade the bottom surface, that is flat in a direction transverse to the longitudinal direction, and pressing flat the base sub-assembly, the base sub-assembly being non-flat in the direction transverse to the longitudinal direction as it is passed along a working edge of the machine.

32. The method of claim 24, wherein preparing the final snowboard assembly by bonding at least one additional layer to the top surface of the base sub-assembly comprises bonding a lower reinforcement layer to the top surface of the base sub-assembly, bonding a core layer to the lower reinforcement layer, and bonding an upper reinforcement layer to the core layer.

33. The method of claim 32, wherein preparing the final snowboard assembly by bonding at least one additional layer to the top surface of the base sub-assembly comprises bonding a top sheet to the upper reinforcement layer.

34. The method of claim 24, wherein the stabilizing layer of the base sub-assembly comprises a lower reinforcement layer, and wherein preparing the final snowboard assembly by bonding at least one additional layer to the top surface of the base sub-assembly comprises bonding a core layer to the base sub-assembly, and bonding an upper reinforcement layer to the core layer.

35. The method of claim 34, wherein preparing the final snowboard assembly by bonding at least one additional layer to the top surface of the base sub-assembly comprises bonding a top sheet to the upper reinforcement layer.

36. The method of claim 24, wherein preparing the final snowboard assembly comprises:
providing final assembly tooling comprising a second cassette defining a respective cavity having a respective bottom surface, and a second cover complementary to the second cassette;
positioning the base sub-assembly in the respective cavity of the second cassette;
positioning the additional layers of the plurality of layers of the snowboard overlying the base sub-assembly;
positioning the second cover over the second cassette to place the final assembly tooling in a closed position with the base sub-assembly and the additional layers of the plurality of layers positioned therebetween; and
bonding the base sub-assembly and additional layers of the plurality of layers together.

37. The method of claim 36, wherein positioning the additional layers of the plurality of layers of the snowboard overlying the base sub-assembly comprises:
positioning a core layer overlying the base sub-assembly; and
positioning an upper reinforcement layer overlying the core layer.

38. The method of claim 36, wherein positioning the additional layers of the plurality of layers of the snowboard overlying the base sub-assembly comprises:
positioning a lower reinforcement layer overlying the base subassembly, and beneath the core layer.

39. The method of claim 36, wherein positioning the additional layers of the plurality of layers of the snowboard overlying the base sub-assembly comprises:
positioning a top sheet overlying the upper reinforcement layer.

40. The method of claim 36, wherein bonding the base sub-assembly and additional layers of the plurality of layers together comprises placing the final assembly tooling, in the closed position with the base sub-assembly and additional layers of the plurality of layers positioned therebetween, and with curable resin applied between adjacent layers, in a press and curing the resin under elevated temperature and pressure in the second compression molding process.

41. The method of claim 36, wherein the providing the final assembly tooling comprises providing final assembly tooling having a flat bottom surface that is flat in a direction of elongation and in a direction transverse to the direction of elongation.

42. The method of claim 36, wherein the providing the final assembly tooling comprises providing final assembly tooling having a non-flat bottom surface that is not flat in at least one of a direction of elongation and a direction transverse to the direction of elongation.

43. The method of claim 36, wherein the providing the final assembly tooling comprises providing final assembly tooling having a non-flat bottom surface that is not flat in a direction transverse to a direction of elongation.

* * * * *